United States Patent
Xue et al.

(10) Patent No.: US 11,632,786 B2
(45) Date of Patent: Apr. 18, 2023

(54) CHANNEL ACCESS CONTENTION MANAGEMENT FOR ULTRA-RELIABLE LOW-LATENCY COMMUNICATION (URLLC)

(71) Applicant: QUALCOMM INCORPORATED, San Diego, CA (US)

(72) Inventors: Yisheng Xue, San Diego, CA (US); Xiaoxia Zhang, San Diego, CA (US); Chih-Hao Liu, San Diego, CA (US); Jing Sun, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 59 days.

(21) Appl. No.: 17/094,115

(22) Filed: Nov. 10, 2020

(65) Prior Publication Data

US 2021/0185719 A1    Jun. 17, 2021

Related U.S. Application Data

(60) Provisional application No. 62/947,920, filed on Dec. 13, 2019.

(51) Int. Cl.
*H04W 72/00* (2023.01)
*H04W 72/23* (2023.01)
(Continued)

(52) U.S. Cl.
CPC ........... *H04W 72/23* (2023.01); *H04L 5/0032* (2013.01); *H04W 72/044* (2013.01);
(Continued)

(58) Field of Classification Search
CPC . H04W 72/12; H04W 72/14; H04W 72/1205; H04W 72/121; H04W 74/00;
(Continued)

(56) References Cited

U.S. PATENT DOCUMENTS 11,388,750 B2 * 7/2022 Kim ................... H04W 74/006
2015/0289293 A1 * 10/2015 Zhang ................... H04L 12/18
455/404.1
(Continued)

FOREIGN PATENT DOCUMENTS

WO     2016081375 A1    5/2016
WO     WO 2017/125077    * 7/2017 ............ H04W 74/08
(Continued)

OTHER PUBLICATIONS

International Search Report and Written Opinion—PCT/US2020/059983—ISA/EPO—dated May 27, 2021.
(Continued)

*Primary Examiner* — Warner Wong
(74) *Attorney, Agent, or Firm* — Haynes and Boone LLP

(57) ABSTRACT

Wireless communications systems and methods related to channel access contention management in a shared radio frequency band are provided. A first wireless communication device communicates, with a second wireless communication device, a grant for communicating a first communication signal, the grant indicating a listen-before-talk (LBT) configuration. The first wireless communication device communicates, with the second wireless communication device, a LBT configuration modification after communicating the grant. The first wireless communication device communicates, with the second wireless communication device, the first communication signal based on the LBT configuration modification.

28 Claims, 15 Drawing Sheets

(51) Int. Cl.
H04W 72/121 (2023.01)
H04W 74/02 (2009.01)
H04L 5/00 (2006.01)
H04W 72/044 (2023.01)
H04W 74/08 (2009.01)

(52) U.S. Cl.
CPC ......... *H04W 72/121* (2013.01); *H04W 74/02* (2013.01); *H04W 74/0816* (2013.01)

(58) Field of Classification Search
CPC ............... H04W 74/02; H04W 72/044; H04W 72/0446; H04W 72/1294; H04W 74/002; H04W 74/008; H04W 74/0816; H04L 5/003; H04L 5/0032; H04L 5/0035
See application file for complete search history.

(56) References Cited

U.S. PATENT DOCUMENTS

| | | | |
|---|---|---|---|
| 2016/0143014 A1* | 5/2016 | Mukherjee | H04L 5/0039 370/330 |
| 2016/0278048 A1 | 9/2016 | Nory et al. | |
| 2017/0019909 A1* | 1/2017 | Si | H04W 76/28 |
| 2017/0105207 A1 | 4/2017 | Fan et al. | |
| 2017/0196020 A1* | 7/2017 | Mukherjee | H04W 74/004 |
| 2017/0202022 A1* | 7/2017 | Chendamarai Kannan | H04W 74/006 |
| 2017/0238342 A1* | 8/2017 | Yang | H04W 72/1268 370/329 |
| 2017/0359808 A1 | 12/2017 | Dinan | |
| 2018/0249484 A1* | 8/2018 | Kim | H04W 74/0808 |
| 2018/0288790 A1* | 10/2018 | Kim | H04L 1/0038 |
| 2018/0317246 A1* | 11/2018 | Mukherjee | H04W 74/0816 |
| 2018/0352573 A1* | 12/2018 | Yang | H04W 16/14 |
| 2018/0352575 A1* | 12/2018 | You | H04W 72/0413 |
| 2019/0007972 A1* | 1/2019 | Gou | H04W 72/0446 |
| 2019/0150196 A1* | 5/2019 | Koorapaty | H04W 72/0446 370/329 |
| 2019/0182865 A1* | 6/2019 | Falahati | H04L 1/1887 |
| 2019/0191456 A1* | 6/2019 | Koorapaty | H04W 72/0446 |
| 2019/0200379 A1* | 6/2019 | Wang | H04W 72/0446 |
| 2019/0246412 A1* | 8/2019 | Noh | H04L 5/0032 |
| 2019/0313454 A1* | 10/2019 | Pu | H04W 28/20 |
| 2020/0100285 A1* | 3/2020 | Roy | H04W 72/1268 |
| 2020/0288498 A1* | 9/2020 | Li | H04L 1/1812 |
| 2020/0396730 A1* | 12/2020 | Kim | H04L 27/26 |
| 2020/0396765 A1 | 12/2020 | Liang et al. | |
| 2021/0153245 A1* | 5/2021 | Tooher | H04W 74/008 |
| 2021/0195639 A1* | 6/2021 | Kim | H04W 72/14 |
| 2021/0352723 A1* | 11/2021 | Ye | H04W 74/008 |
| 2021/0392680 A1* | 12/2021 | Wang | H04W 16/14 |
| 2022/0014930 A1* | 1/2022 | Zhou | H04W 74/0816 |
| 2022/0132573 A1* | 4/2022 | Roy | H04W 72/14 |
| 2022/0150917 A1* | 5/2022 | Wang | H04W 72/1242 |
| 2022/0264637 A1* | 8/2022 | Wang | H04L 1/1896 |

FOREIGN PATENT DOCUMENTS

| | | | | |
|---|---|---|---|---|
| WO | 2018071068 A1 | 4/2018 | | |
| WO | WO-2018143339 A1 * | 8/2018 | ............ | H04W 16/14 |
| WO | 2019160485 A1 | 8/2019 | | |

OTHER PUBLICATIONS

LG Electronics: "Physical Layer Design of DL Signals and Channels for NR-U", 3GPP TSG RAN WG1 #99, 3GPP Draft; R1-1912387, 3rd Generation Partnership Project (3GPP), Mobile Competence Centre 650, Route Des Lucioles; F-06921 Sophia-Antipolis Cedex; France vol. RAN WG1, No. Reno, USA; Nov. 18, 2019-Nov. 22, 2019, Nov. 9, 2019 (Nov. 9, 2019), 16 Pages, XP051823393, Retrieved from the Internet: URL:https://ftp.3gpp.org/tsg_ran/WG1_RL1/TSGR1_99/Doc Channel occupancy structure indication; p. 3-p. 7.

Qualcomm Incorporated: "Enhancements to Scheduling and HARQ operation for NR-U", R1-1900875, 3GPP TSG RAN WG 1 Meeting #AH 1901, Enhancements To Scheduling and HARQ Operation for NR-U, 3rd Generation Partnership Project (3GPP), Mobile Competence Centre; 650, Route Des Lucioles; F-06921 Sophia-Antipolis vol. RAN WG1, No. Taipei, Taiwan; Jan. 21, 2019-Jan. 25, 2019, Jan. 20, 2019 (Jan. 20, 2019), XP051593721,Jan. 12, 2019 (Jan. 12, 2019), 11 Pages, www.3gpp.org, p. 7-p. 8.

VIVO: "Discussion on The Channel Access Procedures", 3GPP Draft, 3GPP TSG RAN WG1#96, R1-1901675, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 15, 2019 (Feb. 15, 2019), XP051599371, 9 pages, Retrieved from the Internet: URL:http://www.3gpp.org/ftp/tsg%5Fran/WG1%5FRL1/TSGR1%5F96/Docs/R1%2D1901675%2Ezip [retrieved on Feb. 15, 2019] Section 2.4; figure 7. p. 7-p. 8.

* cited by examiner

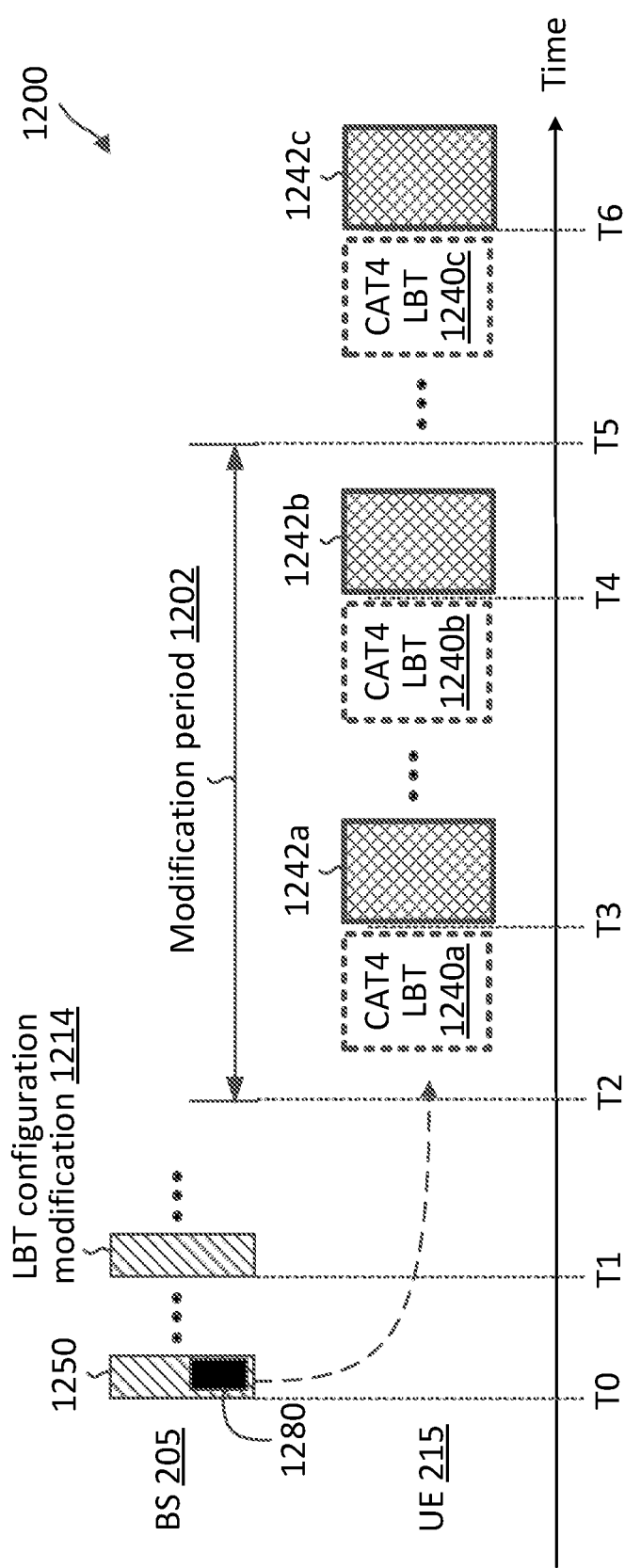
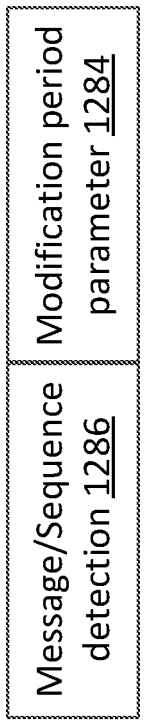
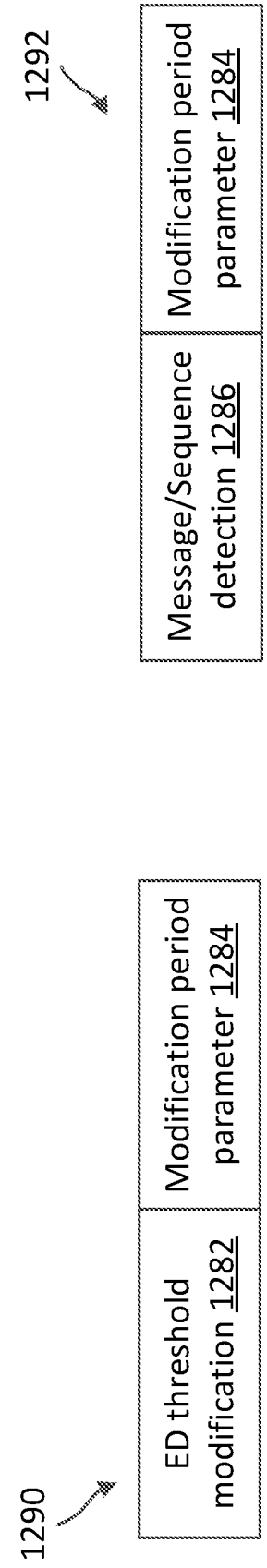
FIG. 12A
FIG. 12B
FIG. 12C

CHANNEL ACCESS CONTENTION MANAGEMENT FOR ULTRA-RELIABLE LOW-LATENCY COMMUNICATION (URLLC)

CROSS REFERENCE TO RELATED APPLICATIONS

The present application claims priority to and the benefit of U.S. Provisional Patent Application No. 62/947,920, filed Dec. 13, 2019, which is hereby incorporated by reference in its entirety as if fully set forth below and for all applicable purposes.

TECHNICAL FIELD

This application relates to wireless communication systems, and more particularly to channel access contention management for ultra-reliable low-latency communication (URLLC).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. For example, a transmitting node may listen to the channel to determine whether there are active transmissions in the channel. When the channel is idle, the transmitting node may transmit a reservation signal (e.g., a preamble) to reserve a channel occupancy time (COT) in the shared channel and may communicate with a receiving node during the COT.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating, by a first wireless communication device with a second wireless communication device, a grant for communicating a first communication signal, the grant indicating a listen-before-talk (LBT) configuration; and communicating, by the first wireless communication device with the second wireless communication device, a LBT configuration modification after communicating the grant; and communicating, by the first wireless communication device with the second wireless communication device, the first communication signal based on the LBT configuration modification.

In an additional aspect of the disclosure, a method of wireless communication includes communicating, by a first wireless communication device with a second wireless communication device, a grant for communicating one or more communication signals, the grant indicating a first listen-before-talk (LBT) configuration associated with a first period; and a second LBT configuration associated with a second period different from the first period; and communicating, by the first wireless communication device with the second wireless communication device, at least one of a first communication signal of the one or more communication signals based on the first LBT configuration during the first period; or a second communication signal of the one or more communication signals based on the second LBT configuration during the second period.

In an additional aspect of the disclosure, an apparatus includes a transceiver configured to communicate, with a second wireless communication device, a grant for communicating a first communication signal, the grant indicating a listen-before-talk (LBT) configuration; and communicate, with the second wireless communication device, a LBT configuration modification after communicating the grant; and communicate, with the second wireless communication device, the first communication signal based on the LBT configuration modification.

In an additional aspect of the disclosure, an apparatus includes a transceiver configured to communicate, with a second wireless communication device, a grant for communicating one or more communication signals, the grant indicating a first listen-before-talk (LBT) configuration associated with a first period; and a second LBT configuration associated with a second period different from the first period; and communicate, with the second wireless communication device, at least one of a first communication signal of the one or more communication signals based on the first LBT configuration during the first period; or a second communication signal of the one or more communication signals based on the second LBT configuration during the second period.

In an additional aspect of the disclosure, a non-transitory computer-readable medium having program code recorded thereon, the program code includes code for causing a first wireless communication device to communicate, with a second wireless communication device, a grant for communicating a first communication signal, the grant indicating a listen-before-talk (LBT) configuration; and code for causing the first wireless communication device to communicate, with the second wireless communication device, a LBT configuration modification after communicating the grant; and code for causing the first wireless communication device to communicate, with the second wireless communication device, the first communication signal based on the LBT configuration modification.

In an additional aspect of the disclosure, a non-transitory computer-readable medium having program code recorded thereon, the program code includes code for causing a first wireless communication device to communicate, with a second wireless communication device, a grant for communicating one or more communication signals, the grant indicating a first listen-before-talk (LBT) configuration associated with a first period; and a second LBT configuration associated with a second period different from the first period; and code for causing the first wireless communication device to communicate, with the second wireless communication device, at least one of a first communication signal of the one or more communication signals based on the first LBT configuration during the first period; or a second communication signal of the one or more communication signals based on the second LBT configuration during the second period.

In an additional aspect of the disclosure, an apparatus includes means for communicating, with a second wireless communication device, a grant for communicating a first communication signal, the grant indicating a listen-before-talk (LBT) configuration; and means for communicating, with the second wireless communication device, a LBT configuration modification after communicating the grant; and means for communicating, with the second wireless communication device, the first communication signal based on the LBT configuration modification.

In an additional aspect of the disclosure, an apparatus includes code for causing a first wireless communication device to communicate, with a second wireless communication device, a grant for communicating one or more communication signals, the grant indicating a first listen-before-talk (LBT) configuration associated with a first period; and a second LBT configuration associated with a second period different from the first period; and means for communicating, with the second wireless communication device, at least one of a first communication signal of the one or more communication signals based on the first LBT configuration during the first period; or a second communication signal of the one or more communication signals based on the second LBT configuration during the second period.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 12A is a timing diagram illustrating a channel access contention scheme according to some aspects of the present disclosure.

FIG. 12B illustrates an LBT configuration modification according to some aspects of the present disclosure.

FIG. 12C illustrates an LBT configuration modification according to some aspects of the present disclosure.

DETAILED DESCRIPTION

Figure 1:
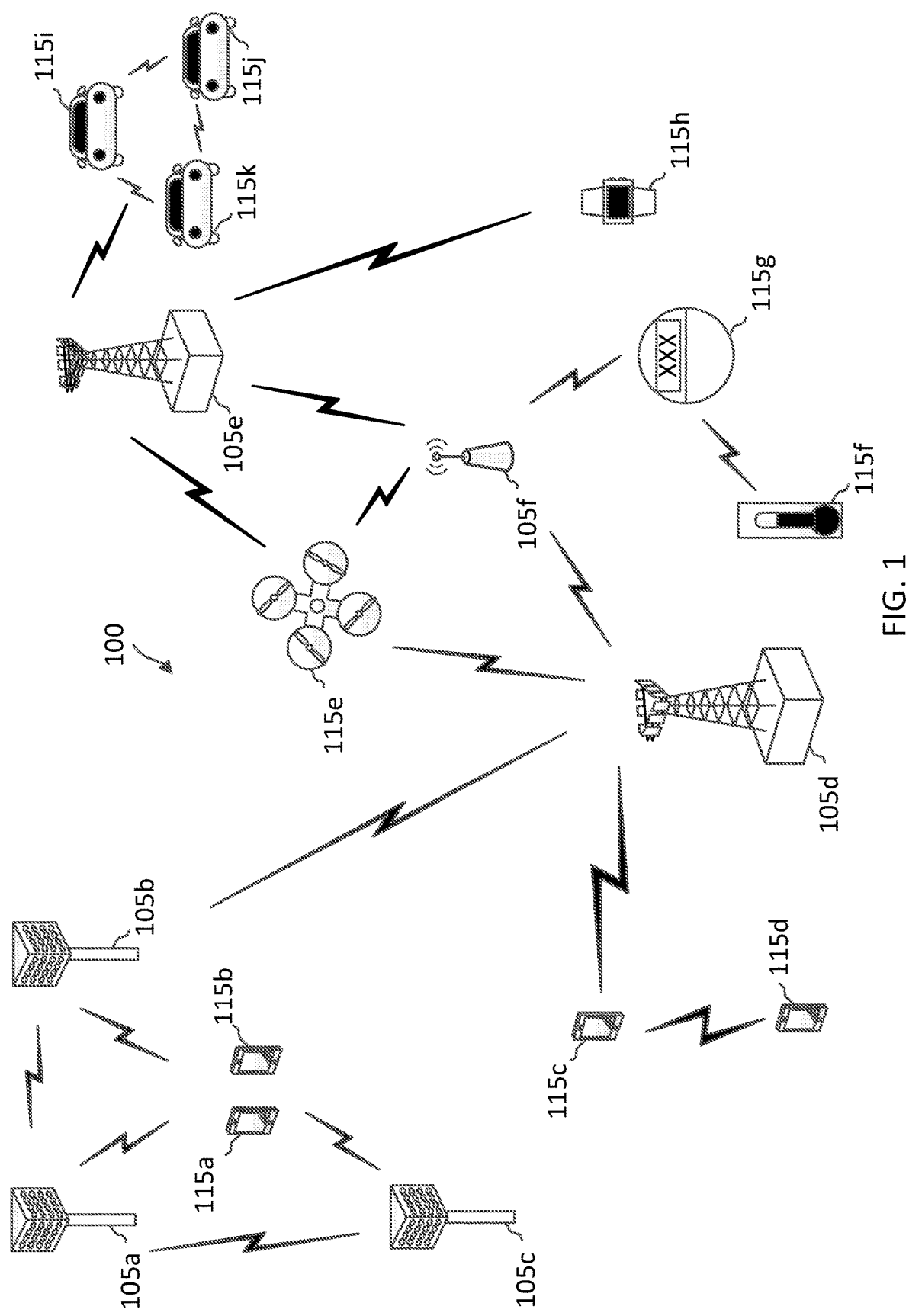
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1 M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., — 1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The deployment of NR over an unlicensed spectrum is referred to as NR-unlicensed (NR-U). Some studies have been conducted for NR-U deployment over a 5 gigahertz (GHz) band to support enhanced mobile broadband (eMBB). Federal Communications Commission (FCC) and European Telecommunications Standards Institute (ETSI) are working on regulating 6 GHz as a new unlicensed band for wireless communications. The addition of 6 GHz bands allows for hundreds of megahertz (MHz) of bandwidth (BW) available for unlicensed band communications. One focus of NR technology is to provide URLLC. However, the deployment of URLLC over an unlicensed spectrum can be challenging due to the contention nature of unlicensed band communications and the low-latency requirement of URLLC.

The present application describes mechanisms for channel access contention management over a shared radio frequency band (e.g., in an unlicensed spectrum or a shared spectrum). For example, a BS may configure a UE with a grant for a UL transmission and may configure the UE with a listen-before-talk (LBT) configuration for performing an LBT prior to the UL transmission. The BS may include the LBT configuration in the grant. The grant can be a dynamic scheduling grant or a semi-static configured grant. A dynamic scheduling grant may indicate a resource scheduled for a UL transmission, which may be referred to as a scheduled UL (SUL) transmission. A semi-static configured grant may indicate a set of resource spaced apart in time (e.g., by a certain time interval) configured for one or more UL transmissions, which may be referred to as configured grant-UL (CG-UL) transmissions. The UE may use any of the configured resources for transmission without having to receive an individual grant from the BS for each configured resource.

In some aspects, the LBT configuration may include various LBT parameters, such as a contention window (CW) size, a CW maximum value, a CW minimum value, an energy detection (ED) threshold, a clear channel assessment (CCA) deferral period, and/or an earliest LBT starting time. The LBT parameters can determine the channel access contention priority of the UL transmission. Accordingly, the BS may control the channel access contention priority for the UL transmission by varying the LBT parameters in the grant.

In some aspects, the BS may modify the LBT configuration by transmitting an LBT configuration modification to the UE after transmitting the configured grant or the dynamic scheduling grant and before the transmission time of the SUL transmission or the CG-UL transmission. For instance, the BS may decrease the channel access contention priority of the SUL transmission or the CG-UL transmission by modifying one or more LBT parameters via the LBT configuration modification, for example, to accommodate a higher priority traffic of the UE, a higher priority traffic of another UE, or a higher priority traffic of the BS. The higher priority traffic may be associated with a UL URLLC, a DL URLLC, and/or a dynamic scheduling grants. Alternatively, the BS may increase the channel access contention priority of the SUL transmission or the CG-UL transmission by modifying one or more LBT parameters via the LBT configuration modification. In some aspects, the BS may indicate that the LBT configuration modification is applicable during a particular time interval.

In some aspects, the BS may configure the UE to perform an LBT based on a signal detection (of a certain signal sequence, a certain waveform, and/or a certain message) instead of a ED. Additionally, the BS may indicate that the signal detection-based LBT is applicable during a particular time interval, but a ED-based LBT may be used outside the particular time interval.

In some aspects, the BS may configure the UE with a configured grant for one or more CG-UL transmission and may apply a certain restriction on a CG-UL transmission outside of a COT of the BS. In this regard, the BS may indicate a restriction rule for a CG-UL transmission within a particular time period after a COT of the BS when the UE had received a dynamic scheduling grant for an SUL transmission during the BS's COT. The CG-UL transmission outside of the BS's COT may be referred to as an out-of-COT CG-UL transmission. The SUL transmission within the BS's COT may be referred to as an in-COT SUL transmission. The restriction can be at various levels. In some aspects, the restriction may prohibit a transmission of the out-of-COT CG-UL transmission and a corresponding LBT in the particular period after the COT. In some aspects, the restriction may prohibit a transmission of the out-of-COT CG-UL transmission and a corresponding LBT in the particular period when the out-of-COT CG-UL transmission has the same traffic priority as the in-COT SUL transmission. In some aspects, the restriction may be on an LBT parameter (e.g., a reduced ED threshold) to be used for an LBT for the out-of-COT CG-UL transmission during the time period. In some aspects, the BS may dynamically enable or disable the restriction.

In some aspects, the BS may transmit a COT structure indicator (SI) at the beginning of a COT acquired by the BS. The COT SI may indicate that the BS owns the COT and indicate an allowable CG-UL traffic priority in the COT. Upon detecting the COT SI, the UE may transmit in a CG-UL resource during the COT when the CG-UL transmission is of the allowable CG-UL traffic priority. Conversely, the UE may refrain from transmitting in a CG-UL resource during the COT when the CG-UL transmission is a traffic priority different from the allowable CG-UL traffic priority or lower than the allowable CG-UL traffic priority.

Aspects of the present disclosure can provide several benefits. For example, the inclusion of the various LBT parameters in a dynamic scheduling grant or a semi-static configured grant allows the BS to have a greater control on the channel access contention priority of the UL transmission. Additionally, the use of the dynamic LBT configuration modification allows the BS to have flexibility in adjusting channel access priorities of already scheduled SUL transmissions and/or configured CG-UL transmissions, and thus the BS may better serve high-priority traffic (e.g., UL URLLC, DL URLLC), satisfying the quality-of-service (QoS) of the high-priority traffic and/or being able to transmit dynamic scheduling grants to schedule UEs for communication. The time-dependent LBT configuration modification can further provide the BS with flexibility in temporarily modifying the channel access priorities of already scheduled SUL transmissions and/or configured CG-UL transmissions. Further, the use of an in-COT SUL transmission to restrict an out-of-COT CG-UL transmission can improve the fairness among different UEs in sharing the shared channel for communications.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-

105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as channel occupancy time (COT). For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

NR-U had adopted ED-based LBT and an LBT ED threshold of about −72 decibel-milliwatts (dBm) for a transmission at a transmission power of about 23 dBm in a 20 MHz BW. Compared to IEEE 802.11 wireless local area network (WLAN) or WiFi, where a preamble detection (PD) threshold of about −82 dBm is used for a transmission at a transmission power of about 23 dBm in a 20 MHz BW, NR-U LBT may not be as sensitive or capable. In other words, NR-U devices may have a smaller sensing region or range where transmissions of other wireless communication devices may be detected compared to WiFi devices (e.g., access points (APs) and stations (STAs)). As such, an LBT approach without scheduling may not operate well for NR-U. Thus, NR-U had adopted a scheduling-based communication scheme, where a serving BS 105 may contend for a COT based on an LBT and dynamically schedule one or more UEs 115 for UL and/or DL communications within the acquired COT. In some instances, the serving BS 105 may also configure the UE 115 with a set of resources for CG-UL transmissions via configured grants. SUL transmissions and CG-UL transmissions are shown in FIG. 2.

Figure 2:
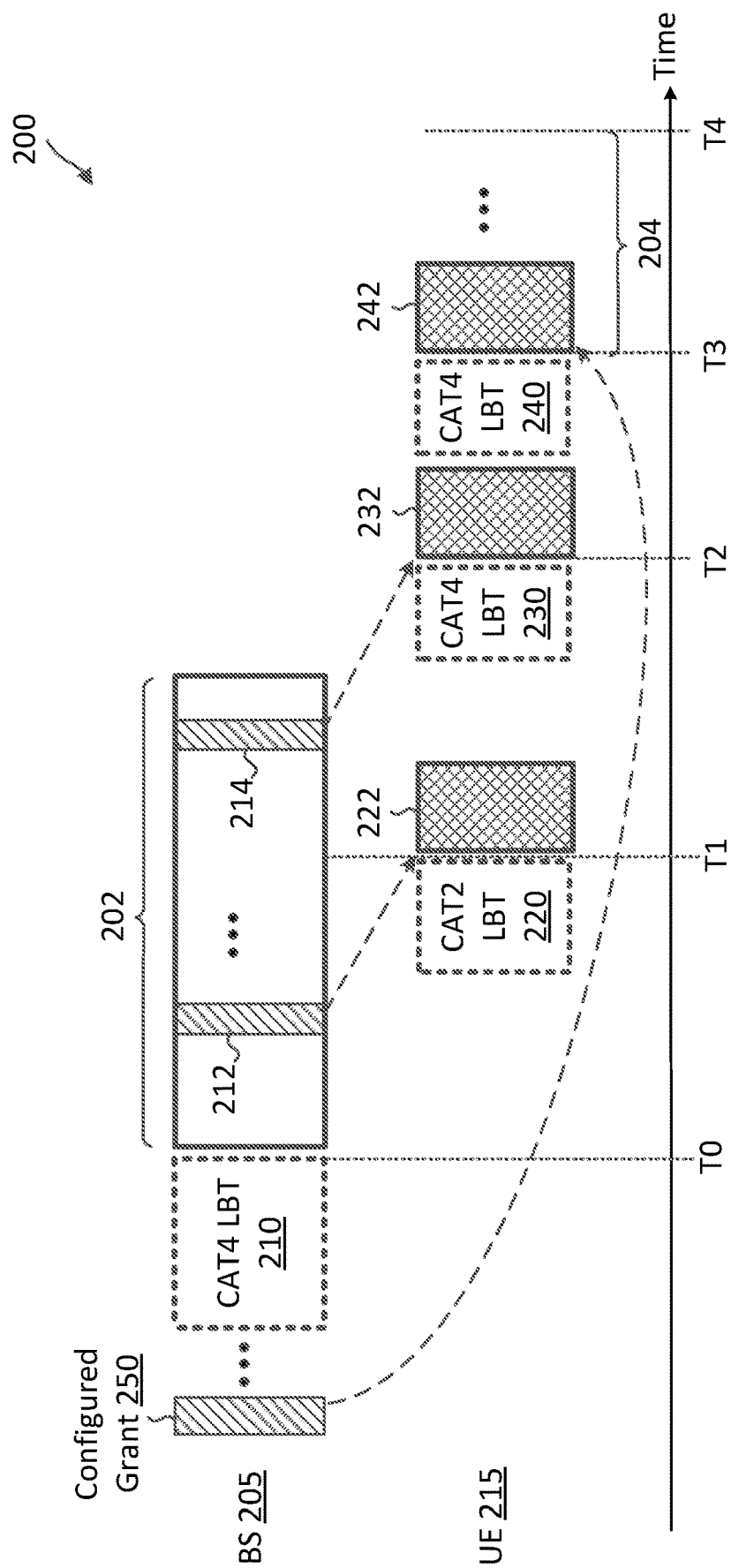
FIG. 2 illustrates a scheduling scheme for communications over a shared radio frequency band according to some aspects of the present disclosure.

FIG. 2 is a timing diagram illustrating a communication scheme 200 over a shared radio frequency band according to some aspects of the present disclosure. The scheme 200 may be employed by BSs such as the BSs 105 and UEs such as the UEs 115 in a network such as the network 100. In particular, a BS may employ the scheme 200 to configure a UE for SUL transmission and/or CG-UL transmissions over a shared radio frequency band (e.g., in an unlicensed spectrum or a shared spectrum) shared by multiple network operating entities. In FIG. 2, the x-axis represent time in some arbitrary units.

In the scheme 200, a BS 205 (e.g., BS 105 in FIG. 1) contends for a COT 202 by performing a CAT4 LBT 210 in a shared channel, for example, using ED mechanisms discussed above with reference to FIG. 1. Upon passing the CAT4 LBT 210, for example, at time T0, the COT 202 may begin. The COT 202 may include one or more slots. The BS 205 may schedule a UE 215 (e.g., UE 115 of FIG. 1) for UL and/or DL communications during the COT 202. As shown, the BS 205 transmits a UL scheduling grant 212 to schedule the UE 215 for a UL communication at a time T1 during the COT 202. The scheduling grant 212 may indicate resources (e.g., time-frequency resources or RBs) allocated for the UL communication and/or transmission parameters (e.g., modulation coding scheme (MCS)) for the UL communication. Upon receiving the UL scheduling grant 212, the UE 215 performs a CAT2 LBT 220 prior to the scheduled time T1, for example, using ED mechanisms discussed above with reference to FIG. 1. At time T1, upon passing the CAT2 LBT 220, the UE transmits a UL communication signal 222 based on the UL scheduling grant 212. The UE 215 may perform the CAT2 LBT 220 for the transmission of the UL communication signal 222 based on the schedule for the UL communication signal 222 being within the BS's COT 202. In some other instances, the UE 215 may not perform any LBT prior to transmitting the UL communication signal 222 based on the BS 205 having acquired the COT 202. The UL communication signal 222 can include UL data and/or UL control information. For instance, the UL data may be carried in a PUSCH and the UL control information may be carried in a PUCCH. The UL control information may include scheduling request (SR), channel state information (CSI) reports, and/or HARQ ACK/NACK feedbacks. The UL data may include eMBB data or URLLC data.

Additionally, the BS transmits a UL scheduling grant 214 to schedule the UE 215 for another UL communication at a time T2 outside of the COT 202. Upon receiving the UL scheduling grant 214, the UE 215 performs a CAT4 LBT 230 prior to the scheduled time TO, for example, using ED mechanisms discussed above with reference to FIG. 1. At time T1, upon passing the CAT4 LBT 230, the UE transmits a UL communication signal 232 based on the UL scheduling grant 214. The UE 215 may perform the CAT4 LBT 230 for the transmission of the UL communication signal 232 based on the schedule for the UL communication signal 232 being outside of the BS's COT 202. The UL scheduling grant 214 and the UL communication signal 232 may be substantially similar to the scheduling grant 212 and the UL communication signal 232, respectively.

In some aspects, the BS 205 may transmit the UL scheduling grants 212 and 214 in a PDCCH via dynamic DCI signaling. The UL scheduling grants 212 and 214 may schedule the UL communication signals 222 and 232, respectively, for example, in the same slot during which the UL scheduling grants 212 and 214 are transmitted or a few slots (e.g., about 1, 2, or 3) after the UL scheduling grants 212 and 214 are transmitted. Accordingly, the UL scheduling grants 212 and 214 are also referred to as dynamic scheduling grants.

Further, the BS 205 transmits a UL configured grant 250 to configure the UE 215 with a set of resources (e.g., time-frequency resource blocks) for transmissions. The BS 205 may transmit the UL configured grant 250 via an RRC configuration. The BS 205 may transmit the UL configured grant 250 during a COT of the BS 205 at an earlier time before time TO. The configured grant 250 may indicate time and frequency locations of the resources and/or a periodicity. For instance, the set of resources may be spaced apart in time. The allocation of the set of resources may be referred to as a semi-static periodic allocation. The UE 215 may use the configured resources for transmission without having to receive an individual scheduling grant from the BS for each configured resource. In the illustrated example of FIG. 2, the configured grant 250 indicates a configured resource at time T3. Since time T3 is outside of the BS's COT 202, the UE performs a CAT4 LBT 240 prior to transmitting in the configured resource. At time T3, upon passing the CAT4 LBT 240, the UE 215 transmits a UL communication signal 242 using the configured resource. The configured grant 250 may indicate a periodicity for the configured resource. For instance, the configured grant 250 may indicate that the configured resource is repeated at a time interval 204, where another resource is configured at time T4 for the UE 215. The UL communication signal 242 may include UL data (e.g., eMBB data or URLLC data) and/or UL control information (e.g., SR, CSI, HARQ ACK/NACK) similar to the UL communication signals 222 and/or 232. The CAT4 LBT 210, 230, and 240 may be substantially similar, but may utilize different LBT parameters, such as CW size for random backoff as described in greater detail herein.

The dynamic scheduling mechanisms and configured resource configuration mechanisms with LBT may operate well for eMBB deployment over NR-U. However, it may not operate well for URLLC deployment over NR-U and/or deployment of both eMBB and URLLC over NR-U as URLLC has a high QoS (e.g., low-latency) demand. For instance, the scheme 200 may not be able to easily preempt an already scheduled or configured eMBB transmission to accommodate the arrival of URLLC data, which may be a low-latency transmission. Additionally, unlike NR-licensed, the BS may not have guaranteed access to the shared radio frequency band due to LBT uncertainty, and thus may not be able to transmit a dynamic scheduling grant at any time, for example, to serve URLLC traffic. As such, the QoS requirement of URLLC may not be satisfied.

Further, in some instances, the UE 215 may transmit at a reduced power, for example, at about 18 dBm in NR-U lite instead of at about 23 dBm in NR-U. For interference management, the UE 215 may adjust the ED threshold for LBT. For instance, the UE 215 may use a ED threshold of about −67 dBm instead of −72 dBm as in NR-U. The higher ED threshold may reduce a sensing range or a sensing region of the UE 215 as shown in FIG. 3.

Figure 3:
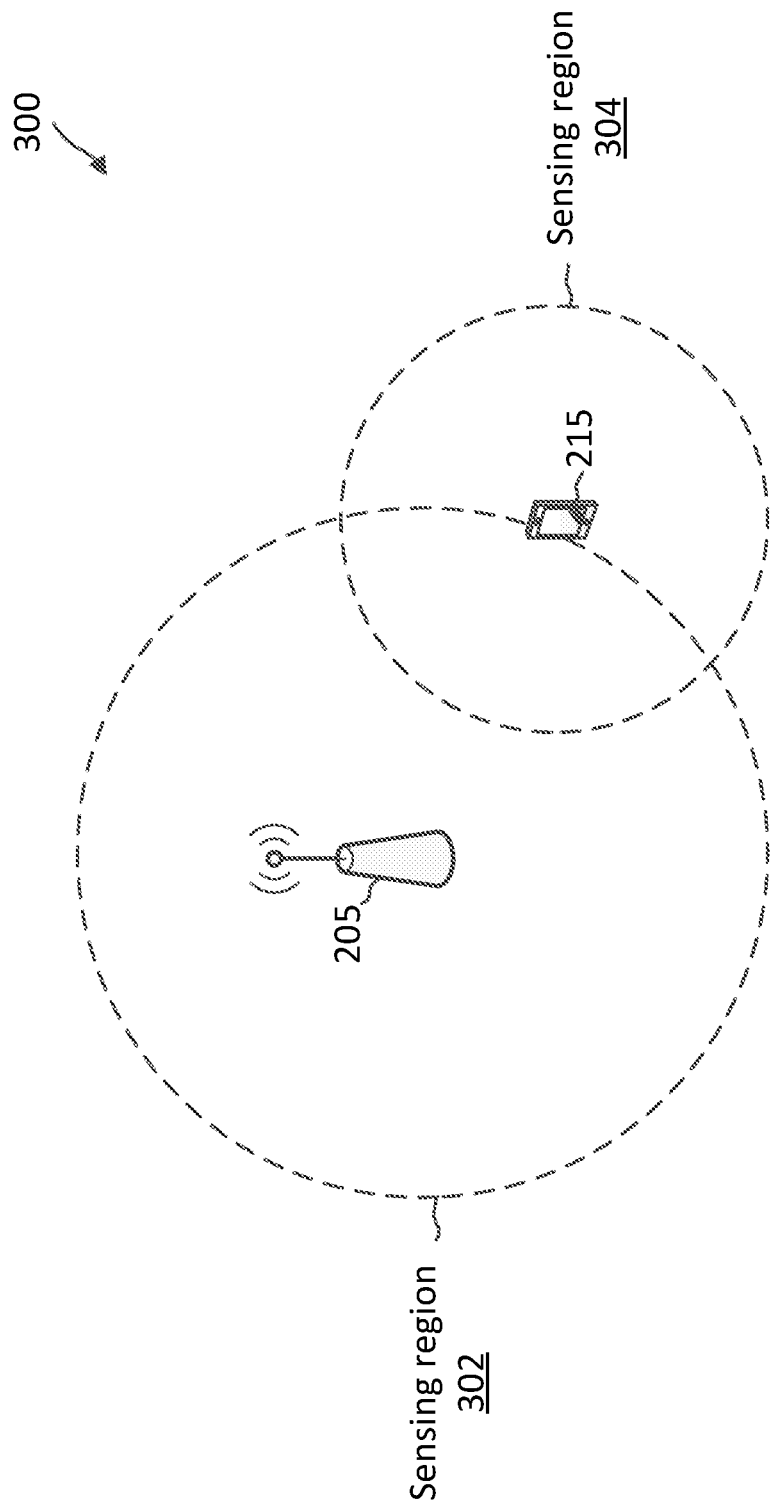
FIG. 3 illustrates a channel access contention scenario in a wireless communication network according to some aspects of the present disclosure.

FIG. 3 illustrates a channel access contention scenario 300 in a wireless communication network (e.g., the network 100) according to some aspects of the present disclosure. In the illustrated example of FIG. 3, the BS 205 applies a ED threshold of about −72 dBm for LBT (e.g., the CAT4 LBT 210) while the UE 215 applies a ED threshold of about −67 dBm for LBT (e.g., the CAT4 LBTs 230 and 240). With a ED threshold of about −72 dBm at the BS 205, the BS 205 may sense a transmission from another device within a sensing range or region 302. With the higher ED threshold of about −67 dBm at the UE 215, the UE 215 may have a smaller sensing range or region 304. With the smaller sensing region 304, the UE 215 may not detect transmissions from the BS 205 (outside of the sensing region 304). As such, the UE 215 may potentially keep gaining access to the channel while the BS 205 may be blocked from transmission since the BS 205 can detect transmissions from the UE 215.

Accordingly, the present disclosure provides techniques for a BS to manage and prioritize channel access for traffic of different priorities (e.g., when deploying URLLC and eMBB) and for contentions between a BS and a UE when operating over a shared radio frequency band. For instance, the BS may control the UL channel access contention priority by configuring the UE with a UL grant (e.g., a dynamic scheduling grant or a configured grant) including LBT parameters for performing an LBT prior to the granted transmission. Additionally, the BS may dynamically adjust or modify the LBT parameters of an already scheduled SUL transmission or an already configured CG-UL transmission to allow for one type of UL traffic (e.g., UL URLLC) to be prioritized over another type of UL traffic (e.g., UL eMBB) or for DL traffic of the BS to be prioritized over UL traffic of the UE. Mechanisms for managing channel access contention priorities are described in greater detail herein.

Figure 4:
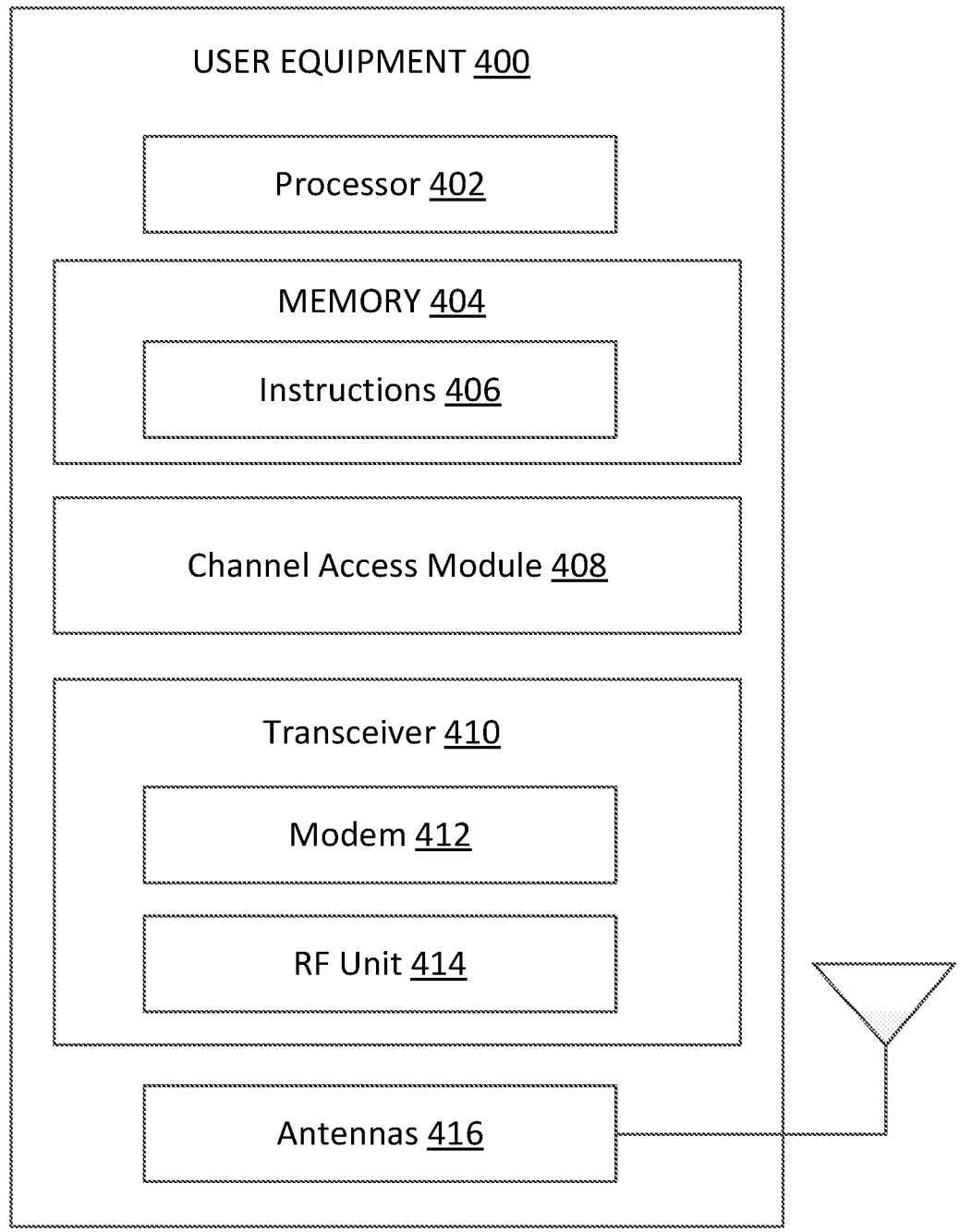
FIG. 4 is a block diagram of a user equipment (UE) according to some aspects of the present disclosure.

FIG. 4 is a block diagram of an exemplary UE 400 according to some aspects of the present disclosure. The UE 400 may be a UE 115 discussed above in FIG. 1 or a UE 215 discussed above in FIGS. 2 and 3. As shown, the UE 400 may include a processor 402, a memory 404, a channel access module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 1-3 and 6A-6B, 7-11, 12A-12C, 13-15. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The channel access module 408 may be implemented via hardware, software, or combinations thereof. For example, the channel access module 408 may be implemented as a processor, circuit, and/or instructions 406 stored in the memory 404 and executed by the processor 402. In some instances, the channel access module 408 can be integrated within the modem subsystem 412. For example, the channel access module 408 can be implemented by a combination of software components (e.g., executed by a DSP or a general processor) and hardware components (e.g., logic gates and circuitry) within the modem subsystem 412.

The channel access module 408 may be used for various aspects of the present disclosure, for example, aspects of FIGS. 1-3, 6A-6B, 7-11, 12A-12C, and 13-15. For instance, the channel access module 408 is configured to receive, from a BS (e.g., the BSs 105 and/or 205), a grant indicating a resource (e.g., a time-frequency resource) for a UL transmission and an LBT configuration for performing an LBT prior to transmitting the UL transmission in the resource, receive a dynamic LBT configuration modification after receiving the grant and before the granted transmission time, perform an LBT based on the LBT configuration modification, and proceed to transmit the UL transmission according to the grant upon passing the LBT. In some instances, the grant may be a dynamic scheduling grant for an SUL transmission and may be received via a PDCCH DCI message. In some other instances, the grant may be a configured grant for a CG-UL transmission and may be received via an RRC configuration. The LBT configuration may include one or more LBT parameters, such as a CW size, a CW maximum value, a CW minimum value, a ED threshold, a CCA deferral period (e.g., a number of CCA slots to defer prior to a CAT4 LBT backoff), and/or an earliest LBT starting time. The LBT configuration modification may modify one or more of the LBT parameters indicated by the LBT configuration or one or more default or preconfigured LBT parameters to increase or decrease the channel access contention priority of the UL transmission. Mechanisms for configuring the LBT based on the LBT parameters and/or modifying the LBT parameters to increase or decrease the channel access contention priority are described in greater detail herein.

In some aspects, the LBT configuration modification indicates a period when the modification is valid or applicable. Accordingly, the channel access module 408 is configured to determine whether a intended SUL resource or a CG-UL resource is within the modification period, perform an LBT according to the LBT configuration modification prior to transmitting in the SUL resource or the CG-UL resource when determining that the SUL resource or the CG-UL resource is within the modification period, and/or perform an LBT according to the LBT configuration (disregarding the modification) prior to transmitting in the SUL resource or the CG-UL resource when determining that the SUL resource or the CG-UL resource is outside the modification period.

In some aspects, the LBT configuration modification indicates a period when a signal detection-based LBT is to be performed instead of a ED-based LBT. Accordingly, the channel access module 408 is configured to determine whether an SUL resource or a CG-UL resource is within the modification period, perform an LBT based on a signal detection prior to transmitting in the SUL resource or the CG-UL resource when determining that the SUL resource or the CG-UL resource is within the modification period, and/or perform an LBT based on a ED (disregarding the modification) prior to transmitting in the SUL resource or the CG-UL resource when determining that the SUL resource or the CG-UL resource is outside the modification period.

In some aspects, the LBT configuration indicates a restriction on an out-of-COT CG-UL transmission within a certain restriction period after a COT based on an in-COT SUL transmission. The restriction can be at various levels. In some aspects, the restriction may prohibit a transmission of the out-of-COT CG-UL transmission and a corresponding LBT in the particular period after the COT. Accordingly, the channel access module 408 is configured to receive a scheduling grant for an SUL transmission in a COT of the BS, determine whether a CG-UL resource is within the restriction period after the COT, and refrain from transmitting in the CG-UL resource when the CG-UL resource is within the restriction period. In some aspects, the restriction may prohibit a transmission of the out-of-COT CG-UL transmission and a corresponding LBT in the particular period when the out-of-COT CG-UL transmission has the same traffic priority as the in-COT SUL transmission. Accordingly, the channel access module 408 is configured to receive a scheduling grant for an SUL transmission in a COT of the BS, determine whether a CG-UL resource is within the restriction period after the COT, determine whether the CG-UL resources is configured for a CG-UL transmission of the same traffic priority as the SUL transmission, and refrain from transmitting in the CG-UL resource when the CG-UL resource is within the restriction period and the CG-UL transmission is of the same transmission priority as the SUL transmission. In some aspects, the restriction may be on an LBT parameter (e.g., a reduced ED threshold) to be used for an LBT for the out-of-COT CG-UL transmission during the time period. Accordingly, the channel access module 408 is configured to receive a scheduling grant for an SUL transmission in a COT of the B S, determine whether a CG-UL resource is within the restriction period after the COT, and perform an LBT with the LBT parameter configured based on the restriction when the CG-UL resource is within the restriction period, and transmit in the CG-UL resource upon passing the LBT.

In some aspects, the channel access module 408 is configured to receive a CG-UL grant from the BS, detect a COT SI from the BS indicating timing information associated with a COT acquired by the BS and an allowable CG-UL traffic priority in the COT, determine that a CG-UL resource configured by the CG-UL grant is within the COT, refrain from transmitting a CG-UL transmission in the CG-UL resource if the CG-UL transmission has a different priority than the allowable CG-UL traffic priority, and/or proceed to transmit a CG-UL transmission in the CG-UL resource if the CG-UL transmission has a priority corresponding to the allowable CG-UL traffic priority. Mechanisms for performing LBT and transmitting UL transmissions according to channel access contention priorities configured and/or modified by the BS are described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404 and/or the channel access module 408 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 414 may be configured to process (e.g., perform analog to digital conversion or digital to analog conversion, etc.) modulated/encoded data (e.g., PUCCH, PUSCH, SUL data, CG-UL data, UL eMBB data, UL URLLC data) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., PDCCH, PDSCH, configured grants, dynamic scheduling grants, RRC configuration, LBT configuration, LBT configuration modification, COT SI, DL eMBB data, DL URLLC data) to the channel access module 408 for processing. The antennas 416 may include multiple antennas of similar or different designs in order to sustain multiple transmission links. The RF unit 414 may configure the antennas 416.

In some aspects, the transceiver 410 is configured to communicate, with a second wireless communication device (e.g., the BSs 105 and/or 205), a grant for communicating a first communication signal, the grant indicating an LBT configuration, communicate, with the second wireless communication device, an LBT configuration modification after communicating the grant, and communicate, with the second wireless communication device, the first communication signal based on the LBT configuration modification, for example, by coordinating with the channel access module 408.

In some aspects, the transceiver 410 is configured to communicate, with a second wireless communication device (e.g., the BSs 105 and/or 205), a grant for communicating one or more communication signals, the grant indicating a first LBT configuration associated with a first period and a second LBT configuration associated with a second period different from the first period, communicate, with the second wireless communication device, at least one of a first communication signal of the one or more communication signals based on the first LBT configuration during the first period or a second communication signal of the one or more communication signals based on the second LBT configuration during the second period, for example, by coordinating with the channel access module 408.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
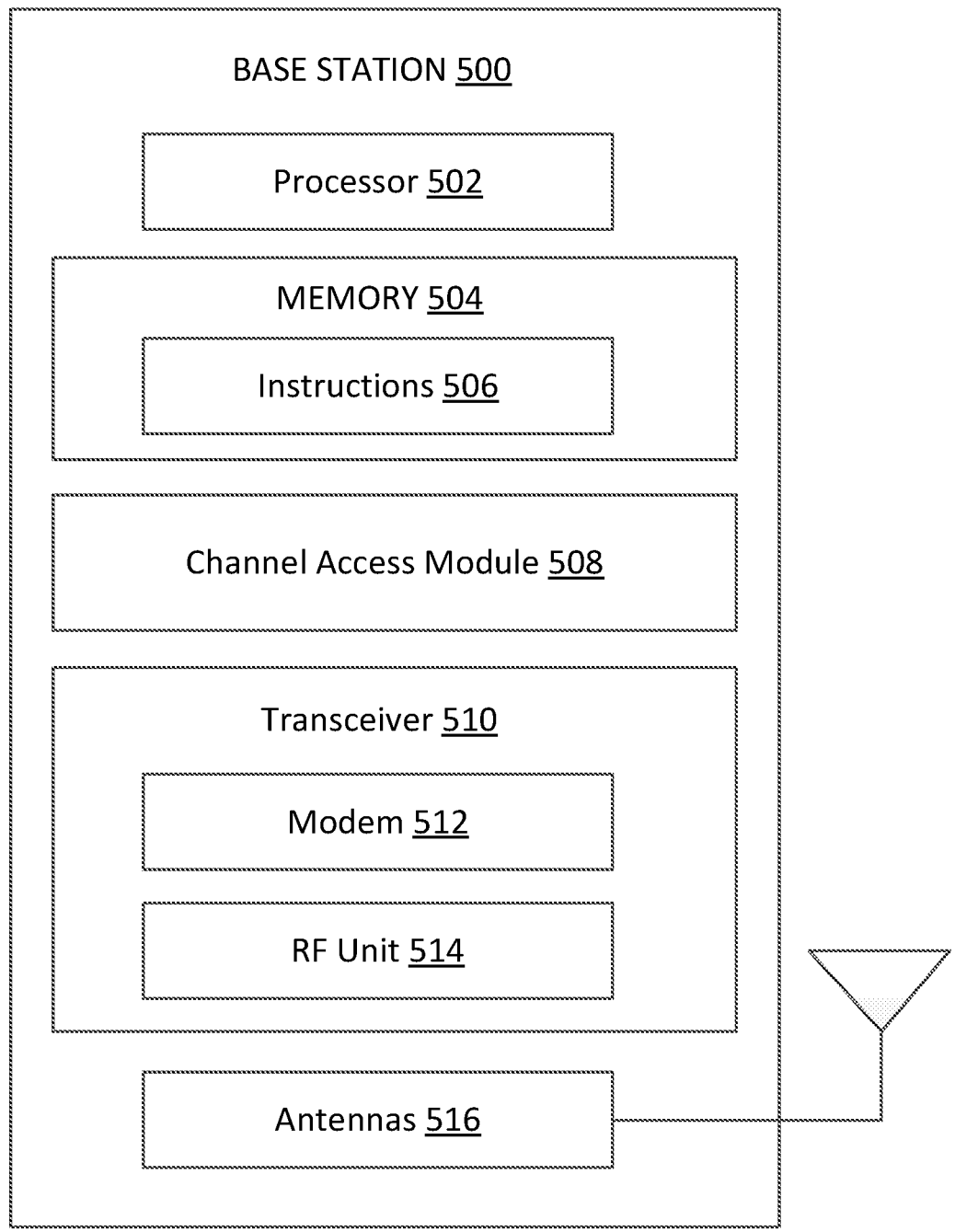
FIG. 5 is a block diagram of an exemplary base station (BS) according to some aspects of the present disclosure.

FIG. 5 is a block diagram of an exemplary BS 500 according to some aspects of the present disclosure. The BS 500 may be a BS 105 in the network 100 as discussed above in FIG. 1. As shown, the BS 500 may include a processor 502, a memory 504, a channel access module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 1-3 and 6A-6B, 7-11, 12A-12C, 13-15. Instructions 506 may also be referred to as code, which may be interpreted broadly to include any type of computer-readable statement(s) as discussed above with respect to FIG. 4.

The channel access module 508 may be implemented via hardware, software, or combinations thereof. For example, the channel access module 508 may be implemented as a processor, circuit, and/or instructions 506 stored in the memory 504 and executed by the processor 502. In some instances, the channel access module 508 can be integrated within the modem subsystem 512. For example, the channel access module 508 can be implemented by a combination of software components (e.g., executed by a DSP or a general processor) and hardware components (e.g., logic gates and circuitry) within the modem subsystem 512.

The channel access module 508 may be used for various aspects of the present disclosure, for example, aspects of FIGS. 1-3 and 6A-6B, 7-11, 12A-12C, 13-15. For instance, the channel access module 508 is configured to transmit, to a UE (e.g., the UEs 115, 215, and/or 400), a grant indicating a resource (e.g., a time-frequency resource) for a UL transmission and an LBT configuration for performing an LBT prior to transmitting the UL transmission in the resource, transmit a dynamic LBT configuration modification after transmitting the grant and before the granted transmission time, and receive the UL transmission from the UE in the resource indicated by the grant. In some instances, the grant may be a dynamic scheduling grant for an SUL transmission and may be transmitted via a PDCCH DCI message. In some other instances, the grant may be a configured grant for a CG-UL transmission and may be transmitted via an RRC configuration.

In some aspects, the channel access module 508 is configured to determine a channel access contention priority for the grant (e.g., based on the traffic priority of the UL transmission), determine one or more LBT parameters (e.g., a CW size, a CW maximum value, a CW minimum value, a ED threshold, a number of CCA deferral slots, and/or an earliest LBT starting time) for the LBT configuration based on the determine channel access priority. When the grant is for a high-priority traffic (e.g., URLLC), the channel access module 508 is configured to select a smaller CW size, a higher ED threshold, a less number of CCA deferral slots, and/or an earlier time for the LBT starting time for the LBT configuration. When the grant is for a low-priority traffic (e.g., eMBB traffic), the channel access module 508 is configured to select a larger CW size, a lower ED threshold, a greater number of CCA deferral slots, and/or a later time for the LBT starting time for the LBT configuration.

In some aspects, the channel access module 508 is configured to decrease the channel access priority of the earlier scheduled SUL transmission or the earlier configured CG-UL transmission, for example, to prioritize a higher priority traffic (e.g., URLLC) of the UE, a higher priority traffic or another UE, or DL traffic of the BS 500. For instance, the channel access module 508 is configured to modify the LBT configuration by increasing the CW size, decreasing the ED threshold, increasing the number of CCA deferral slots, and/or postponing the LBT starting time to decrease the channel access contention priority configured by the LBT configuration and include the modified LBT parameters) in the LBT configuration modification.

In some aspects, the channel access module 508 is configured to increase the channel access priority of the earlier scheduled SUL transmission or the earlier configured CG-UL transmission, for example, based on a notification from the UE that UL URLLC traffic has arrived at the UE and/or a prediction that the UE may have UL URLLC traffic ready (e.g., via machine learning techniques). For instance, the channel access module 508 is configured to modify the LBT configuration by decreasing the CW size, increasing ED threshold, decreasing the number of CCA deferral slots, and/or advancing the LBT starting time to increase the channel access contention priority configured by the LBT configuration and indicate the modified LBT parameter(s) in the LBT configuration modification.

In some aspects, the channel access module 508 is configured to determine a modification period for the LBT configuration modification (e.g., based on arrival of DL URLLC and/or UL URLLC discussed above) and include an indication of the modification period in the LBT configuration modification. In some aspects, the channel access module 508 is configured to indicate, in the LBT configuration or the LBT configuration modification, a set of one or more predetermined sequences or messages to be used for channel occupancy detection during an LBT instead of based on the ED threshold.

In some aspects, the channel access module 508 is configured to indicate, in the LBT configuration or the LBT configuration modification, a restriction on an out-of-COT CG-UL transmission within a certain restriction period after a COT based on an in-COT SUL transmission. The restriction can be at various levels. In some aspects, the restriction may prohibit a transmission of the out-of-COT CG-UL transmission and a corresponding LBT in the particular period after the COT. In some aspects, the restriction may prohibit a transmission of the out-of-COT CG-UL transmission and a corresponding LBT in the particular period when the out-of-COT CG-UL transmission has the same traffic priority as the in-COT SUL transmission. In some aspects, the restriction may be on an LBT parameter (e.g., a reduced ED threshold) to be used for an LBT for the out-of-COT CG-UL transmission during the time period.

In some aspects, the channel access module 508 is configured to perform a CAT4 LBT to acquire a COT, transmit a COT SI indicating timing information associated with the COT and an allowable CG-UL traffic priority in the COT. Mechanisms for managing channel access contention priorities are described in greater detail herein.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS, e.g., a LDPC coding scheme, a turbo coding scheme, a convolutional coding scheme, a polar coding scheme, a digital beamforming scheme, etc. The RF unit 514 may be configured to process (e.g., perform analog to digital conversion or digital to analog conversion, etc.) modulated/encoded data (e.g., PDCCH, PDSCH, configured grants, dynamic scheduling grants, RRC configuration, LBT configuration, LBT configuration modification, COT SI, DL eMBB data, DL URLLC data) from the modem subsystem 512 (on outbound transmissions) or of transmissions originating from another source such as a UE 115 and/or UE 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to some aspects of the present disclosure. The antennas 516 may further receive data messages transmitted from other devices and provide the received data messages for processing and/or demodulation at the transceiver 510. The transceiver 510 may provide the demodulated and decoded data (e.g., PUCCH, PUSCH, SUL data, CG-UL data, eMBB data, URLLC data) to the channel access module 508 for processing. The antennas 516 may include multiple antennas of similar or different designs in order to sustain multiple transmission links.

In some aspects, the transceiver 510 is configured to communicate, with a second wireless communication device (e.g., the UEs 115, 215, and/or 400), a grant for communicating a first communication signal, the grant indicating an LBT configuration, communicate, with the second wireless communication device, an LBT configuration modification after communicating the grant, and communicate, with the second wireless communication device, the first communication signal based on the LBT configuration modification, for example, by coordinating with the channel access module 508.

In some aspects, the transceiver 510 is configured to communicate, with a second wireless communication device (e.g., the UEs 115, 215, and/or 400), a grant for communicating one or more communication signals, the grant indicating a first LBT configuration associated with a first period and a second LBT configuration associated with a second period different from the first period, communicate, with the second wireless communication device, at least one of a first communication signal of the one or more communication signals based on the first LBT configuration during the first period or a second communication signal of the one or more communication signals based on the second LBT configuration during the second period, for example, by coordinating with the channel access module 508.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

FIGS. 6A-6B, 7-11, 12A-12C, and 13 illustrate various mechanisms for a network (e.g., the networks 100) or a BS (e.g., the BSs 105, 205, and/or 500) to manage channel access in a shared channel or shared radio frequency band (e.g., in an unlicensed spectrum), for example, to support high-priority traffic or traffic with a high QoS demand such as URLLC. For simplicity of illustration, not all BS's transmissions are shown within a COT FIGS. 6A-6B, 7-11, 12A-12C, and 13. However, it should be understood that the BS may perform a CAT4 LBT (e.g., the CAT4 LBT 210) to acquire a COT (e.g., the COT 202) and may proceed with a transmission within an acquired COT upon passing the CAT4 LBT.

Figure 6A:
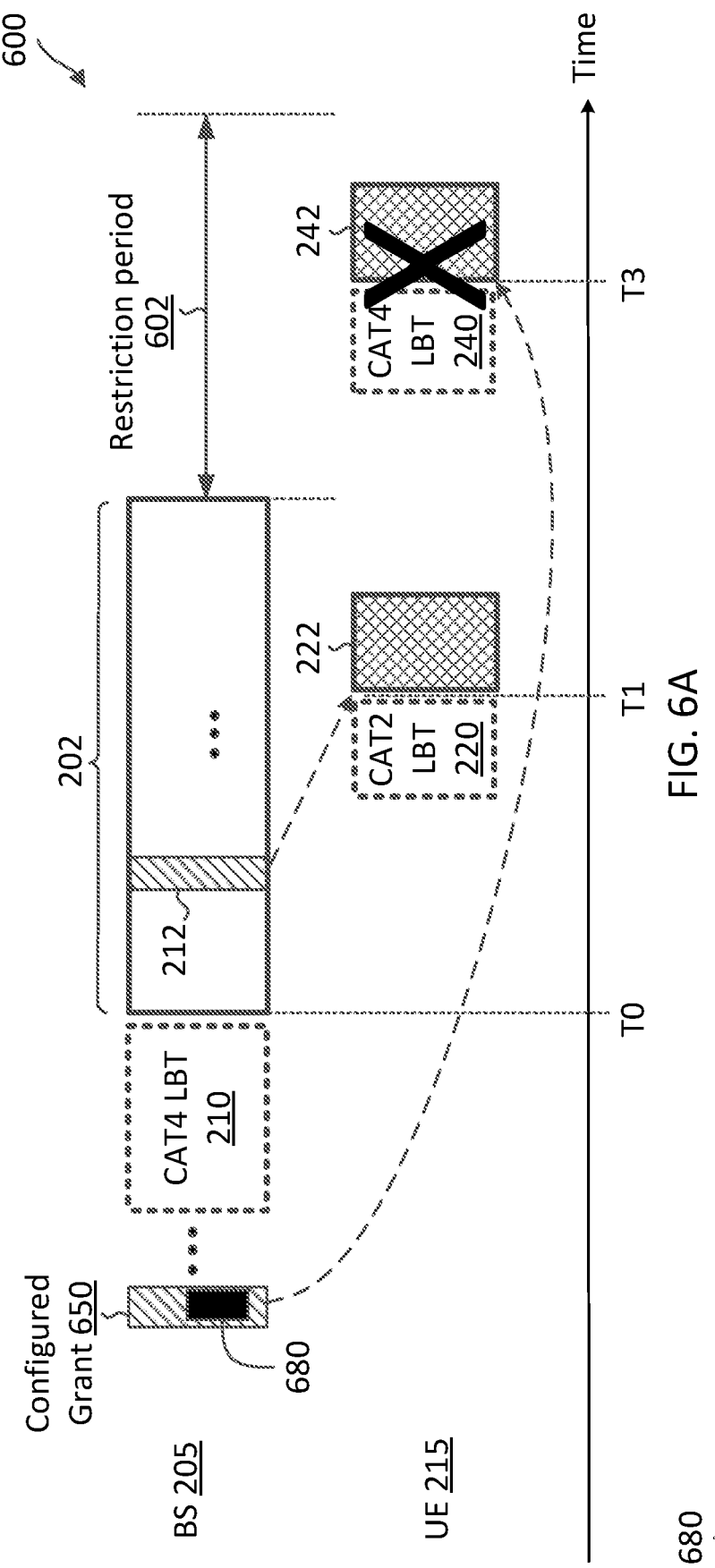
FIG. 6A is a timing diagram illustrating a channel access contention scheme according to some aspects of the present disclosure.

FIG. 6A will be discussed in relation to FIG. 6B to illustrate mechanisms for restricting an out-of-COT CG-UL transmission based on an in-COT SUL transmission. In this regard, a BS (e.g., the BSs 105, 205, and/or 500) may restrict a UE (e.g., the UEs 115, 215, and/or 400) in using a CG-UL resource during a certain time interval after a COT of the BS if the UE had been scheduled by the BS for an SUL transmission during the BS's COT.

FIG. 6A is a timing diagram illustrating a channel access contention scheme 600 according to some aspects of the present disclosure. The scheme 600 may be employed by BSs such as the BSs 105 and 205 and UEs such as the UEs 115 and 215 in a network such as the network 100. In particular, a BS 205 may manage channel access contentions as shown in the scheme 600. In FIG. 6A, the x-axis represent time in some arbitrary units. The scheme 600 is described using a similar communication scenario as in FIG. 2, and may use the same reference numerals as in FIG. 2 for simplicity's sake.

In the scheme 600, the BS 205 configures the UE 215 with a configured grant 650. The configured grant 650 may be substantially similar to the configured grant 250 (e.g., indicating a configured resource at time T3 and a periodicity for the configured resource), and additionally includes an LBT configuration 680. The LBT configuration 680 may include various LBT parameters (e.g., in an LBT parameter field 682 shown in FIG. 6B) for the UE 215 to perform the CAT4 LBT 240 prior to transmitting the UL communication signal 242 in the configured resource. The LBT configuration 680 may indicate a CAT4 LBT type and LBT parameters, such as a CW size, a CW minimum value, a CW maximum value, a ED threshold, a number of deferral CCA slots, and/or an earliest CAT4 LBT starting point.

In some aspects, the UE 215 may perform a random backoff based on the CW size, for example, by drawing a random number from a range of values corresponding to the CW size. For instance, if the CW size is 64, the UE 215 may draw a random number from a range of values between 0 and 64 for random backoff. The UE 215 may configure a backoff period by setting a counter based on the drawn random number in a certain time unit. If the channel remains idle for the duration of the backoff period, the UE 215 may transmit at the end of the backoff period (e.g., when the counter counts to zero). In some other instance, the UE 215 may draw a random number from a range of values between the CW minimum value and the CW maximum value.

In some aspects, the UE 215 may determine whether a channel is available or busy based on a comparison between a signal energy measurement and the ED threshold. For instance, the UE 215 may receive a signal from the shared channel, compute a received signal power, and compare the computed signal power against the ED threshold. If the received signal power is greater than the ED threshold, the UE 215 determines that the channel is occupied. If the received signal power is less than the ED threshold, the UE 215 determines that the channel is available.

In some aspects, the UE 215 may defer the CAT4 LBT 240 by the number of deferral CCA slots. For instance, the UE 215 may configure a waiting period by setting up a counter based on the number of deferral CCA slots. If the channel is clear or available during the deferral CCA slots, the UE 215 any proceed with the CAT4 LBT 240 at the end of the waiting period (e.g., when the counter counts to zero). If the channel is busy during the deferral CCA slots, the UE 215 may restart the deferral (e.g., by resetting the counter based on the number of deferral CCA slots). Further, if the UE 215 detects that the channel is busy during the backoff period, the UE 215 may wait for another CCA deferral period (e.g., based on the number of deferral CCA slots) and may resume the backoff if the channel is clear during the CCA deferral period.

In some aspects, the UE 215 may start to perform the CAT4 LBT 240 after the earliest CAT4 LBT starting point. For instance, the UE 215 may wait till the earliest CAT4 LBT starting point to start the CCA deferral or the random backoff.

In general, the LBT configuration 680 may indicate any suitable combination of the LBT parameters and the UE 215 may utilize the indicated LBT parameters when performing the CAT4 LBT 240. The BS 205 may control the channel access contention priority of the UL communication signal 242 by adjusting the LBT parameters. For instance, a larger CW size corresponds to a lower channel access contention priority, whereas a smaller CW size corresponds to a higher channel access contention priority. A lower ED threshold corresponds to a lower channel access contention priority, whereas a higher ED threshold corresponds to a higher channel access contention priority. A greater number of CCA deferral slots corresponds to a lower channel access contention priority, whereas a less number of CCA deferral slots corresponds to a higher channel access contention priority. A later CAT4 LBT starting point corresponds to a lower channel access contention priority, whereas an earlier CAT4 LBT starting point corresponds to a higher channel access contention priority.

In the scheme 600, if the BS 205 granted the UE 215 with a UL transmission (e.g., the UL communication signal 222) within the COT 202, the BS 205 restricts a CG-UL transmission (e.g., the UL communication signal 242) of the UE 215 outside the COT 202 for a restriction period 602 beginning at the end of the COT 202. The BS 205 may indicate the restriction period 602 in the LBT configuration 680 (e.g., in a restriction period field 684 shown in FIG. 6B).

The restriction can be at various levels. In some aspects, the BS 205 prohibits the UE 215 from conducting a CAT4 LBT for an out-of-COT CG-UL transmission (e.g., the UL communication signal 242) during a certain time interval (e.g., the restriction period 602) after the COT 202 when the BS 205 granted the UE 215 with an SUL transmission (e.g., the UL communication signal 222) during the COT 202. In the illustrated example of FIG. 6A, the BS 205 granted the UE 215 with the SUL communication signal 222 within the COT 202, and thus the UE 215 may refrain from performing the CAT4 LBT 240 and transmitting the CG-UL communication signal 242 during the restriction period 602 after the COT 202 (as shown by the cross symbol "X").

In some aspects, the BS 205 prohibits the UE 215 from conducting the CAT4 LBT 240 and the transmission of the out-of-COT CG-UL communication signal 242 if the in-COT SUL communication signal 222 and the out-of-COT CG-UL communication signal 242 are of the same traffic priority class. For instance, the prohibition may apply when the in-COT SUL communication signal 222 and the out-of- COT CG-UL communication signal 242 are URLLC traffic. Alternatively, the prohibition may apply when the in-COT SUL communication signal 222 and the out-of-COT CG-UL communication signal 242 are eMBB traffic. The BS may indicate the traffic priority class information in the LBT configuration 680 (e.g., in a priority class parameter field 686 shown in FIG. 6B).

In some aspects, the BS 205 may decrease the channel access contention priority for transmitting the out-of-COT CG-UL communication signal 242. In this regard, the BS 205 may instruct the UE 215 to reduce a ED threshold for the CAT4 LBT 240 in the restriction period 602. Alternatively or additionally, the BS 205 may instruct the UE 215 to increase the CW size, for example, by doubling the CW size, for the CAT4 LBT 240 in the restriction period 602. The BS may indicate the contention priority change in the LBT configuration 680 (e.g., in a contention priority change field 688 shown in FIG. 6B).

In some aspects, the BS 205 may use any suitable combinations of the restrictions discussed above to restrict an out-of-COT CG-UL transmission based on an in-COT SUL transmission. For instance, the BS 205 may configure the UE 215 with a reduced the channel access contention priority for an out-of-COT CG-UL transmission in the restriction period 602 based on an in-COT SUL transmission irrespective of the traffic priorities of the out-of-COT CG-UL transmission and the in-COT SUL transmission. Alternatively, the BS 205 may configure the UE 215 with a reduced the channel access contention priority for an out-of-COT CG-UL transmission in the restriction period 602 based on an in-COT SUL transmission when the out-of-COT CG-UL transmission has the same traffic priority as the in-COT SUL transmission.

Figure 6B:
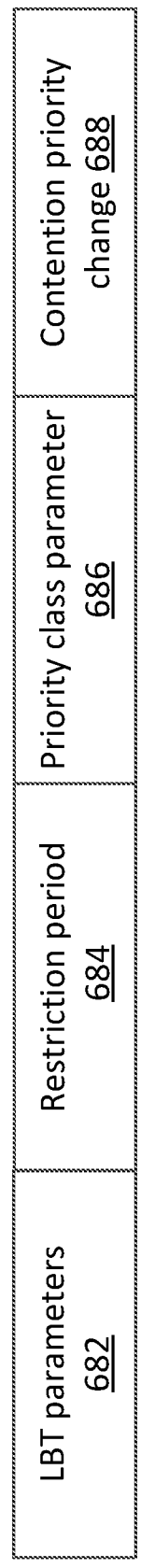
FIG. 6B illustrates a listen-before-talk (LBT) configuration according to some aspects of the present disclosure.

FIG. 6B illustrates a message structure for the LBT configuration 680 according to some aspects of the present disclosure. The LBT configuration 680 may include one or more of the LBT parameter field 682, the restriction period field 684, the priority class field 686, and the contention priority change field 688. For example, in some instances, the LBT configuration 680 may include the LBT parameter field 682 and the restriction period field 684. In some instances, the LBT configuration 680 may include the LBT parameter field 682, the restriction period field 684, and the priority class field 686. In some instances, the LBT configuration 680 may include all the LBT parameter field 682, the restriction period field 684, the priority class field 686, and the contention priority change field 688.

The LBT parameter field 682 may include one or more LBT parameters, such as a CW size, a CW maximum value, a CW minimum value, a ED threshold, a number of deferral CCA slots, and/or an earlier CAT4 LBT starting point, as discussed above. The restriction period field 684 may indicate a duration of the restriction period 602 in any suitable time units (e.g., in symbols, slots, or ms). The priority class field 686 may indicate whether the restriction is based on the in-COT SUL transmission and the out-of-COT CG-UL transmission having the same traffic priority class (e.g., by indicating a bit-value of 1) or irrespective of a traffic priority (e.g., by indicating a bit-value of 0). The contention priority change field 688 may indicate whether the restriction reduces the contention priority of the CAT4 LBT. For instance, the contention priority change field 688 may be set to a value of 1 to indicate that the ED threshold is to be reduced for the CAT4 LBT 240 in the restriction period 602 and may be set to a value of 2 to indicate that the CW size is to be doubled.

Figure 7:
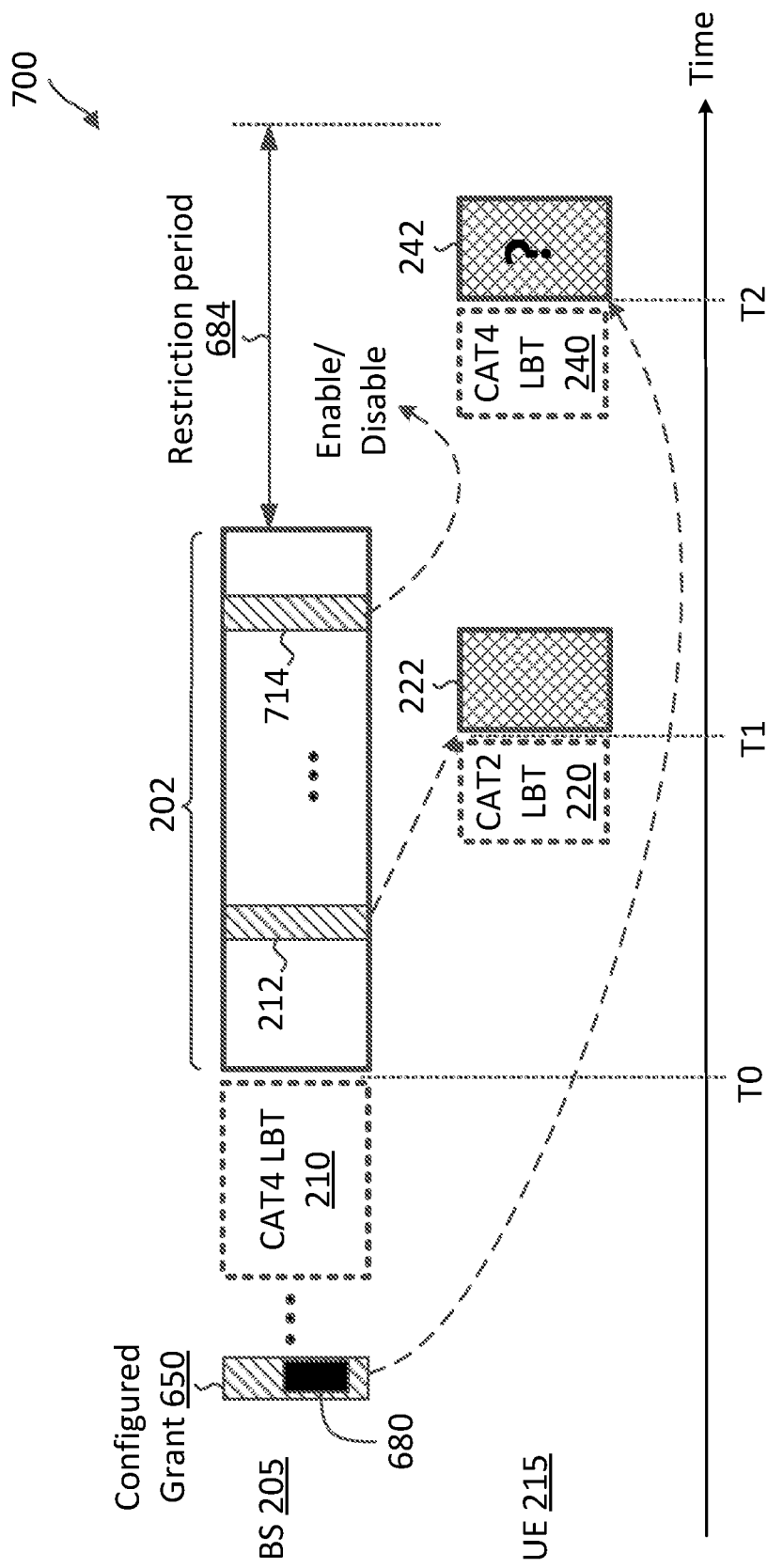
FIG. 7 is a timing diagram illustrating a channel access contention scheme according to some aspects of the present disclosure.

FIG. 7 is a timing diagram illustrating a channel access contention scheme 700 according to some aspects of the present disclosure. The scheme 700 may be employed by BSs such as the BSs 105 and 205 and UEs such as the UEs 115 and 215 in a network such as the network 100. In particular, a BS 205 may manage channel access contentions as shown in the scheme 700. In FIG. 7, the x-axis represent time in some arbitrary units. The scheme 700 is substantially similar to the scheme 600, and may use the same reference numerals as in FIG. 6 for simplicity's sake. However, in the scheme 700, the BS 205 may further transmit a restriction on/off command 714 to enable or disable the restriction period 602. In this regard, if the restriction on/off command 714 indicates an on command, the UE 215 may apply the restriction during the restriction period 602 as indicated by the LBT configuration 680 for an out-of-COT CG-UL transmission based on an in-COT SUL transmission as discussed above. However, if the restriction on/off command 714 indicates an off command, the UE 215 may disregard the restriction during the restriction period 602. In other words, the UE 215 may perform the CAT4 LBT 240 based on the LBT parameters (in the LBT parameter field 682) indicated by the LBT configuration 680 and proceed with transmitting the out-of-COT CG-UL transmission 242 irrespective of whether an SUL transmission 222 is scheduled in the COT 202 for the UE 215. In some aspects, the BS 205 may transmit the restriction on/off command 714 via dynamic DCI signaling (e.g., in a DCI message carried in a PDCCH) to dynamically enable or disable the restriction, for example, based on an occupancy of the shared channel. For instance, if the shared channel has a high occupancy rate, the BS 205 may enable the restriction. Alternatively, if the shared channel has a low occupancy rate, the BS 205 may disable the restriction. In some aspects, the BS 205 may enable the restriction using a bit-value of 1 and may disable the restriction using a bit-value of 0.

Figure 8:
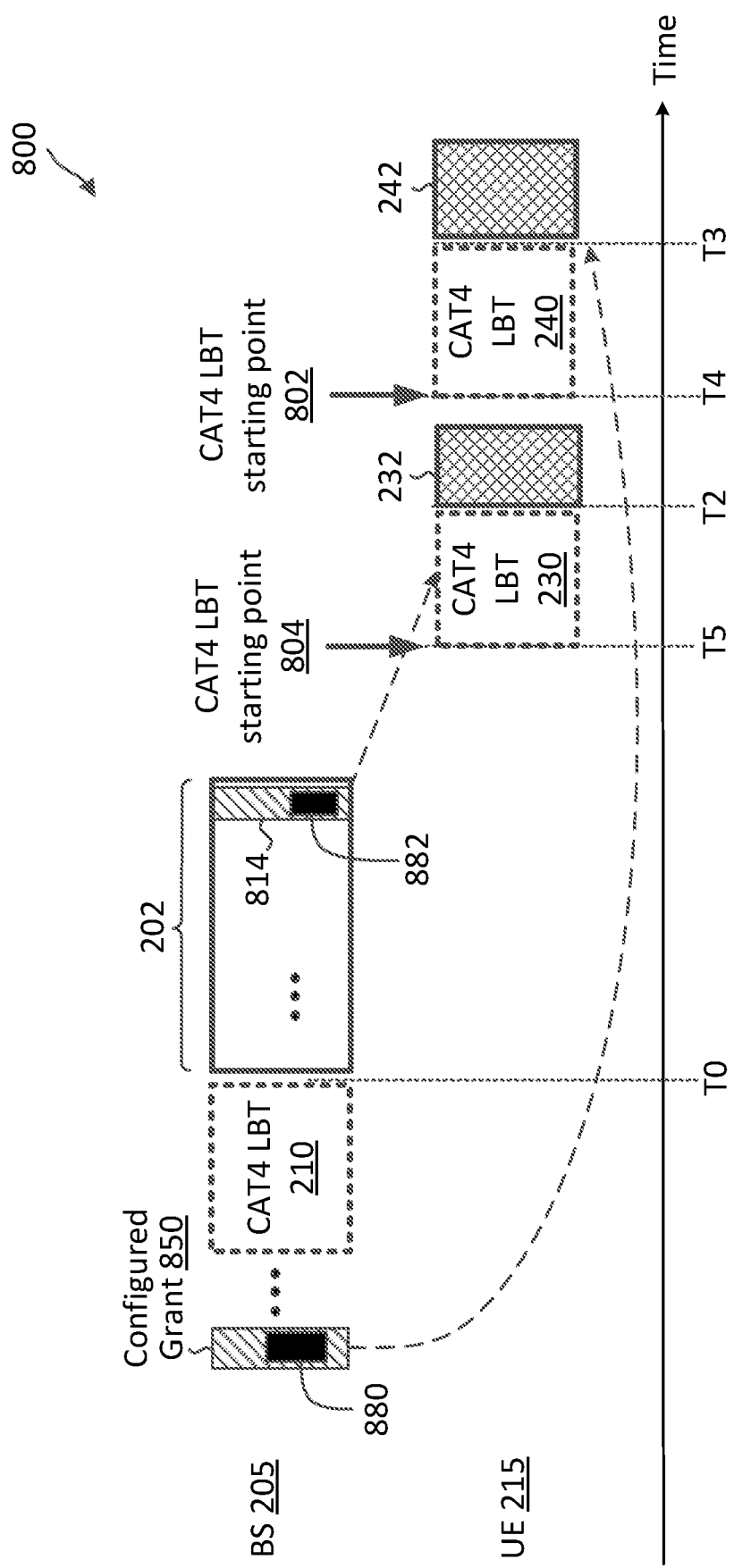
FIG. 8 is a timing diagram illustrating a channel access contention scheme according to some aspects of the present disclosure.

FIG. 8 is a timing diagram illustrating a channel access contention scheme 800 according to some aspects of the present disclosure. The scheme 800 may be employed by BSs such as the BSs 105 and 205 and UEs such as the UEs 115 and 215 in a network such as the network 100. In particular, a BS 205 may manage channel access contentions as shown in the scheme 800. In FIG. 8, the x-axis represent time in some arbitrary units. The scheme 800 is described using a similar communication scenario as in FIG. 2, and may use the same reference numerals as in FIG. 2 for simplicity's sake. In the scheme 800, the BS 205 may control the starting time of a CAT4 LBT prior to a CG-UL transmission or an SUL transmission.

In this regard, the BS 205 configures the UE 215 with a configured grant 850 including an LBT configuration 880 indicating an earliest time when the UE 215 may start to perform a CAT4 LBT prior to transmit a CG-UL transmission. The configured grant 850 may indicate a configured resource at time T3 and a periodicity for the configured resource similar to the configure grant 250. In some instances, the LBT configuration 880 may also include other LBT parameters (e.g., CW size, ED threshold, and/or a CCA deferral period) as discussed above.

In the illustrated example of FIG. 8, the LBT configuration 880 indicates an earliest CAT4 LBT starting time 802 (at time T4). Thus, the UE 215 may wait till at least time T4 to begin a random backoff for the CAT4 LBT 240. When the UE 215 is configured with a CCA deferral period, the CCA deferral period may start at time T4.

Similarly, the BS 205 may dynamically schedule the UE 215 for a UL transmission outside of the COT 202 by transmitting a scheduling grant 814 similar to the scheduling grant 214 (e.g., via PDCCH DCI), and additionally includes an LBT configuration 882 in the scheduling grant 814. The LBT configuration 882 may include an earliest time when the UE 215 may start to perform a CAT4 LBT 230 for transmitting the UL communication signal 232. In some instances, the LBT configuration 882 may also include other LBT parameters (e.g., CW size, ED threshold, and/or a CCA deferral period) as discussed above.

In the illustrated example of FIG. 8, the LBT configuration 880 indicates an earliest CAT4 LBT starting time 804 (at time T5) for performing a CAT4 LBT 230 for the UL communication signa. 232. Thus, the UE 215 may wait till at least time T5 to begin a random backoff for the CAT4 LBT 230. When the UE 215 is configured with a CCA deferral period, the CCA deferral period may start at time T5.

The LBT configuration 880 may indicate the earliest CAT4 LBT starting time 802 in any suitable time units. In some aspects, the LBT configuration 880 may indicate the earliest CAT4 LBT starting time 802 as an offset from the start of a corresponding transmission time (e.g., time offset=T3-T4). Similarly, the LBT configuration 882 may indicate the earliest CAT4 LBT starting time 804 as an offset from the start of a corresponding transmission time (e.g., time offset=T2-T5).

In some aspects, the BS 205 may configure the earliest CAT4 LBT starting time 802 or 804 to prioritize DL traffic over UL traffic. In this regard, the BS 205 may restrict the UE 215 to start the CAT4 LBT at a later time in order to allow the BS 205 to have a chance in competing for the shared channel before the UE 215, for example, to serve DL URLLC traffic.

Figure 9:
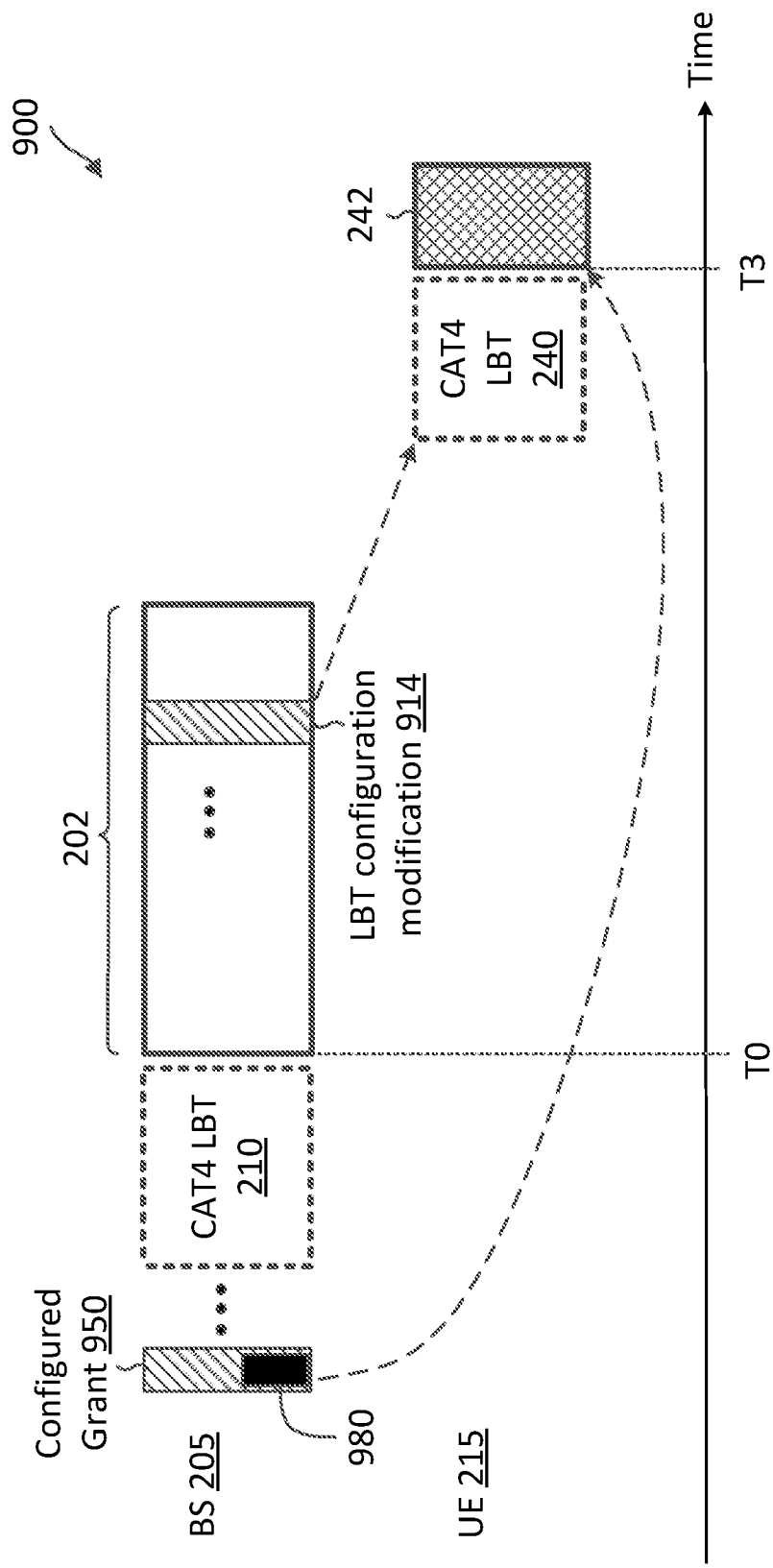
FIG. 9 is a timing diagram illustrating a channel access contention modification scheme according to some aspects of the present disclosure.

FIG. 9 is a timing diagram illustrating a channel access contention modification scheme 900 according to some aspects of the present disclosure. The scheme 900 may be employed by BSs such as the BSs 105 and 205 and UEs such as the UEs 115 and 215 in a network such as the network 100. In particular, a BS 205 may manage channel access contentions as shown in the scheme 900. In FIG. 9, the x-axis represent time in some arbitrary units. The scheme 900 is described using a similar communication scenario as in FIG. 2, and may use the same reference numerals as in FIG. 2 for simplicity's sake. In the scheme 900, the BS 205 dynamically modifies the LBT configuration for a CG-UL transmission configured at an earlier time.

As shown, the BS 205 configures the UE 215 with a configured grant 950. The configured grant 950 may be substantially similar to the configured grant 250, for example, indicating a configured resource at time T3 and may include a periodicity for the configured resource, and includes an LBT configuration 980. The LBT configuration 980 may be substantially similar to the LBT configurations 680 and/or 880. For instance, the LBT configuration 980 may include one or more LBT parameters, such as a CW size, a CW maximum value, a CW minimum value, a ED threshold, a CCA deferral period, and/or an earliest CAT4 starting point as discussed above with reference to FIGS. 6A, 6B, 7, and/or 8.

In the scheme 900, the BS 205 dynamically modifies the LBT configuration 980 at a later time after transmitting the configured grant 950 to modify a channel access contention priority. In the illustrated example of FIG. 9, the BS 205 transmits an LBT configuration modification 914, for example, during the COT 202, after transmitting the configured grant 950. The BS 205 may transmit the LBT configuration modification 914 as a PDCCH DCI message (e.g., dynamic DCI signaling). The LBT configuration modification 914 may modify one or more LBT parameters indicated by the LBT configuration 980. Upon receiving the LBT configuration modification 914, the UE 215 may perform the CAT4 LBT 240 based on the LBT configuration modification 914. If the CAT4 LBT 240 is a pass, the UE 215 may transmit the UL communication signal 242 in the configured resource. If the CAT4 LBT 240 fails, the UE 215 may refrain from transmitting in the configured resource.

In some aspects, the configured grant 950 may be a grant for UL eMBB traffic (e.g., the UL communication signal 242) and the BS 205 may decrease the channel access contention priority for transmitting the UL eMBB traffic in order to prioritize a UL URLLC traffic transmission of another UE (e.g., the UEs 115 and/or 215). In some aspects, the BS 205 may decrease the channel access contention priority for transmitting the UL communication signal 242 in order to prioritize a DL transmission (e.g., DL URLLC traffic or scheduling grants).

The BS 205 may modify a channel access contention priority by modifying various LBT parameters. In some aspects, the LBT configuration 980 indicates a first CW size and the LBT configuration modification 914 indicates a second CW size different from the first CW size. For instance, the LBT configuration modification 914 may configure the second CW size to be larger than the first CW size to reduce the channel access contention priority of the earlier granted transmission (e.g., the UL communication signal 242). In some instances, the second CW size can be twice the first CW size.

In some aspects, the LBT configuration 980 indicates a first CCA period and the LBT configuration modification 914 indicates a second CCA period different from the first CCA period. For instance, the LBT configuration modification 914 may configure the second CCA period to include a greater number of CCA deferral slots than the first CCA period to reduce the channel access contention priority of the earlier granted transmission (e.g., the UL communication signal 242).

In some aspects, the LBT configuration 980 indicates a first LBT starting time (e.g., the earliest CAT4 LBT starting times 802 and 804) and the LBT configuration modification 914 indicates a second LBT starting time different from the first LBT starting time. For instance, the LBT configuration modification 914 may configure the second LBT starting time to be later than the first LBT starting time to reduce the channel access contention priority of the earlier granted transmission (e.g., the UL communication signal 242).

In some aspects, the LBT configuration 980 indicates a first ED threshold and the LBT configuration modification 914 indicates a second ED threshold different from the first ED threshold. For instance, the LBT configuration modification 914 may configure the second ED threshold to be lower than the first ED threshold to reduce the channel access contention priority of the earlier granted transmission (e.g., the UL communication signal 242).

In some other aspects, the LBT configuration modification 914 can modifies an LBT parameter to increase the channel access contention priority of the earlier granted transmission (e.g., the UL communication signal 242), for example, by reducing a CW size, decreasing a CCA deferral period, increasing a ED threshold, and/or modifying the CAT4 starting time to an earlier time. For instance, the configured grant 950 may be a grant for UL URLLC traffic and the BS 205 may detect that the UE 215 has UL URLLC traffic, and thus may increase the channel access contention priority so that the UE 215 may be have a higher chance in winning a contention in the share channel. In this regard, the BS 205 may determine that the UE 215 has UL URLLC traffic ready for transmission using various mechanisms. For instance, the BS 205 may receive a request for a UL URLLC transmission schedule from the UE 215, for example, in a frequency band, such as a licensed band or another unlicensed band, different from the frequency band where the configured grant 950 is transmitted. In some other instances, the BS 205 may determine that the UE 215 has UL URLLC traffic ready for transmission based on a traffic prediction. The prediction can be based on observing UL URLLC traffic pattern of the UE 215 over a duration of time. In some instances, the BS 205 may apply machine learning techniques to perform the prediction.

Figure 10:
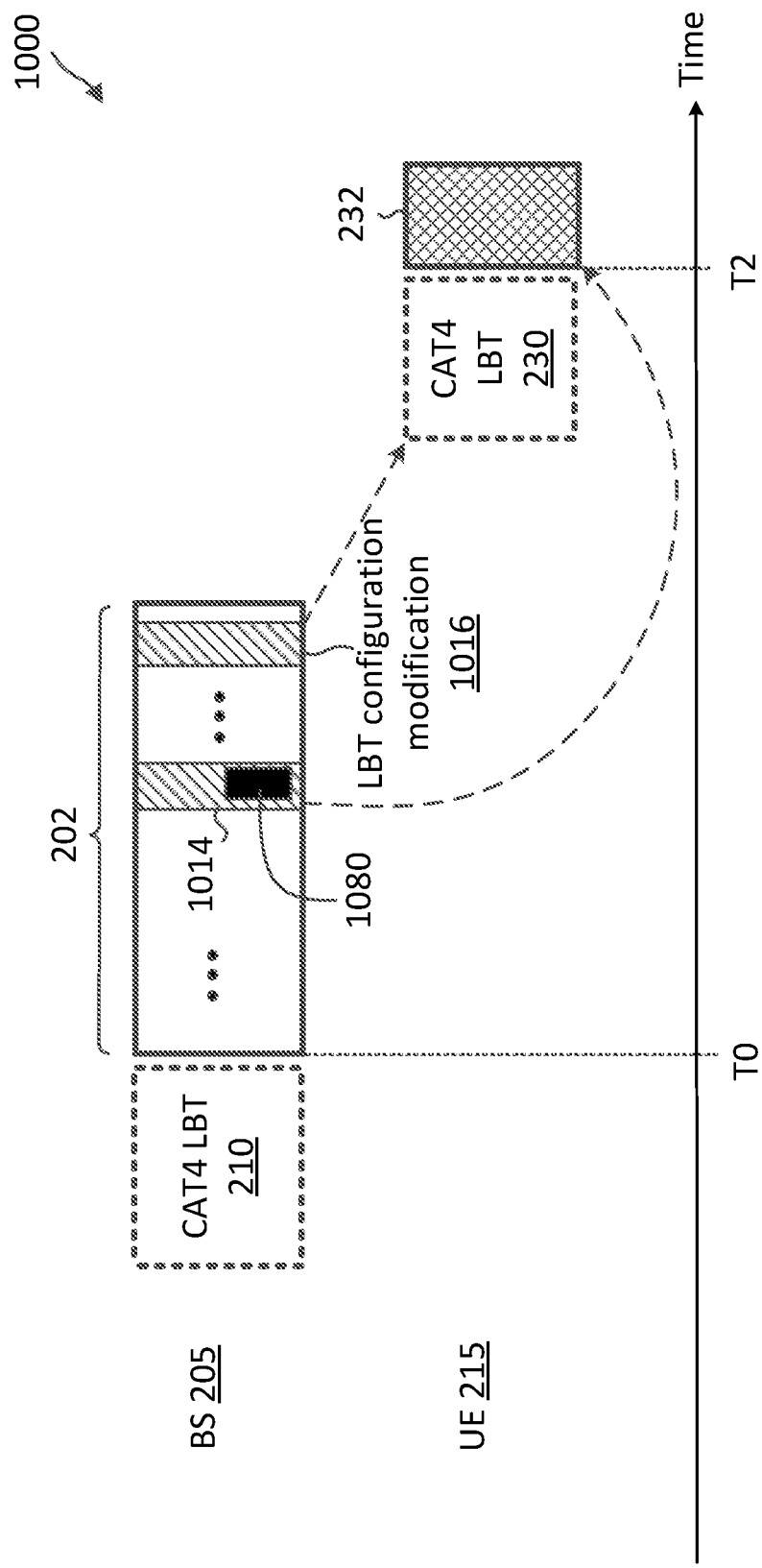
FIG. 10 is a timing diagram illustrating a channel access contention modification scheme according to some aspects of the present disclosure.

FIG. 10 is a timing diagram illustrating a channel access contention modification scheme 1000 according to some aspects of the present disclosure. The scheme 1000 may be employed by BSs such as the BSs 105 and 205 and UEs such as the UEs 115 and 215 in a network such as the network 100. In particular, a BS 205 may manage channel access contentions as shown in the scheme 1000. In FIG. 10, the x-axis represent time in some arbitrary units. The scheme 1000 is substantially similar to the scheme 900, and illustrate a scenario where an LBT configuration modification is applied to a dynamic SUL transmission instead of a CG-UL transmission. The scheme 1000 is described using a similar communication scenario as in FIG. 2, and may use the same reference numerals as in FIG. 2 for simplicity's sake.

As shown, the BS 205 transmits a UL scheduling grant 1014 to schedule the UE 215 for a UL transmission at time T3 outside the COT 202. The UL scheduling grant 1014 may be substantially similar to the scheduling grant 214, but additionally includes an LBT configuration 1080. The LBT configuration 1080 may be substantially similar to the LBT configurations 680, 880, and/or 980. For instance, the LBT configuration 1080 may include one or more LBT parameters, such as a CW size, a CW maximum value, a CW minimum value, a ED threshold, a CCA deferral period, and/or an earliest CAT4 starting point as discussed above.

Similar to the scheme 900, the BS 205 may dynamically modify the LBT configuration 1080 at a later time after transmitting the LBT configuration modification 1016 to modify a channel access contention priority of the earlier scheduled UL transmission. In the illustrated example of FIG. 10, the BS 205 transmits an LBT configuration modification 1016 after transmitting the scheduling grant 1014 (via dynamic DCI signaling). The LBT configuration modification 1016 may modify one or more LBT parameters indicated by the LBT configuration 1080. For instance, the LBT configuration modification 1016 may modify a CW size, a ED threshold, a CCA deferral period, and/or a CAT4 LBT starting time as discussed above in the scheme 900 with reference to FIG. 9.

Figure 11:
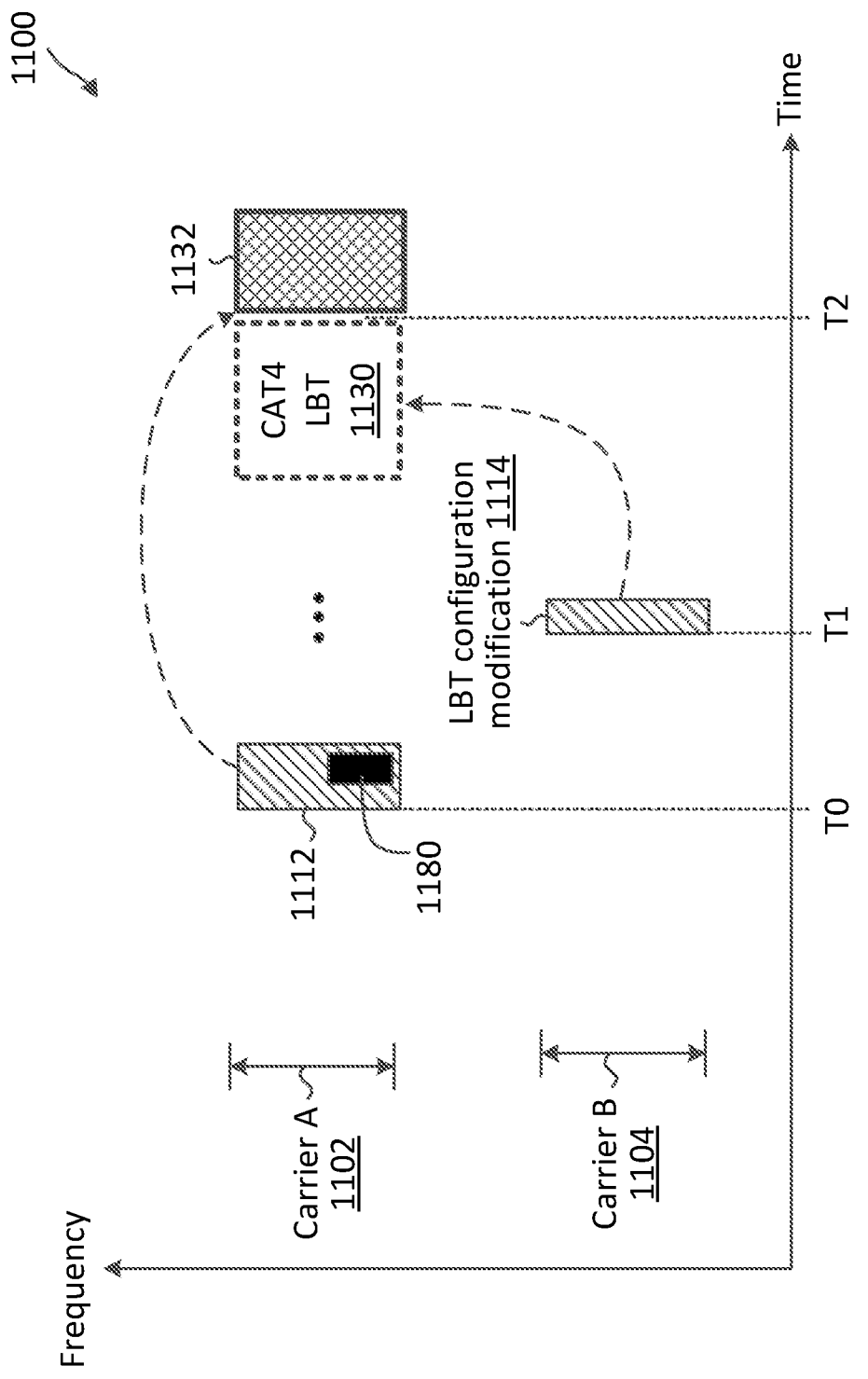
FIG. 11 illustrates a channel access contention modification scheme according to some aspects of the present disclosure.

FIG. 11 illustrates a channel access contention modification scheme 1100 according to some aspects of the present disclosure. The scheme 1100 may be employed by BSs such as the BSs 105 and 205 and UEs such as the UEs 115 and 215 in a network such as the network 100. In particular, a BS 205 may manage channel access contentions as shown in the scheme 1100. In FIG. 11, the x-axis represent time in some arbitrary units, and the y-axis represents frequency in some constant units. The scheme 1100 is substantially similar to the schemes 900 and 1000, and illustrate a scenario where an LBT configuration modification is transmitted in a different frequency carrier or frequency band than the scheduling grant or configured grant. For instance, the BS 205 may configure the UE 215 to operate in a carrier aggregation (CA) mode over two separate frequency bands (e.g., a frequency carrier A 1102 and a frequency carrier B 1104). In some other instances, the BS 205 may configure the UE 215 to operate in a dual connectivity (DC) mode over two separate frequency bands (e.g., a frequency carrier A 1102 and a frequency carrier B 1104).

In this regard, at time T0, the BS 205 transmits a UL grant 1112 to the UE 215 over a frequency carrier A 1102 (e.g., an unlicensed band). The UL grant 1112 grants the UE 215 for a UL transmission 1132 in the frequency carrier A 1102 at time T2 and includes an LBT configuration 1180 for performing a CAT4 LBT 1130 prior to the UL transmission 1132. In some instances, the UL grant 1112 may be a configured grant similar to the configured grants 250, 650, 850, and/or 950, for example, transmitted via an RRC configuration, and thus the UL transmission 1132 is a CG-UL transmission. In some other instances, the UL grant 1112 may be a dynamic scheduling grant similar to the UL scheduling grants 212, 214, and/or 814, for example, transmitted via a PDCCH DCI message, and thus the UL transmission 1132 is an SUL transmission. The LBT configuration 1180 may be substantially similar to the LBT configurations 680, 880, 980, and/or 1080. For instance, the LBT configuration 1180 may include one or more LBT parameters, such as a CW size, a CW maximum value, a CW minimum value, a ED threshold, a CCA deferral period, and/or an earliest CAT4 starting point as discussed above for the CAT4 LBT 1130.

Similar to the schemes 900 and 1000, the BS 205 may dynamically modify the LBT configuration 1180 at a later time after transmitting the UL grant 1112 to modify a channel access contention priority of the earlier granted UL transmission. However, in the scheme 1100, the BS 205 may transmit an LBT configuration modification 1114 in a different frequency carrier than the frequency carrier where the UL grant 1112 is transmitted. In the illustrated example of FIG. 11, at time T1, the BS 205 transmits the LBT configuration modification 1114 in a frequency carrier B 1104. In some instances, the frequency carrier B 1104 is a licensed band. In some other instances, the frequency carrier in an unlicensed band. The LBT configuration modification 1114 may modify one or more LBT parameters indicated by the LBT configuration 1180. For instance, the LBT configuration modification 1114 may modify a CW size, a ED threshold, a CCA deferral period, and/or a CAT4 LBT starting time as discussed above in the scheme 900 with reference to FIG. 9.

In some aspects, the BS 205 may transmit the UL grant 1112 and the LBT configuration modification 1114 to the UE 215 via different transmission-reception points (TRPs). In this regard, the BS 205 may be in communication with multiple TRPs located at different geographical locations and may configure one TRP to transmit the UL grant 1112 to the UE 215 and configure another TRP to transmit the LBT configuration modification 1114 to the UE 215.

In some aspects, the BS 205 may transmit an LBT configuration modification (e.g., the LBT configuration modifications 914, 1016, and/or 1114) via a GC-PDCCH DCI message to a group of UEs to modify a channel access contention priority at each of the UEs instead of transmitting a separate LBT configuration modification to each UE via UE-specific DCI. Accordingly, the BS 205 may group UEs (e.g., the UEs 115 and/or 215) according to traffic priority classes. In some aspects, the LBT configuration modification may indicate that the modification may apply to a UL transmission carrying eMBB traffic, but may not apply to a UL transmission carrying URLLC traffic. For instance, upon receiving the LBT configuration modification, the UE 215 may determine whether the earlier scheduled SUL transmission or the earlier configured CG-UL transmission grant is associated with eMBB or URLLC. If the earlier scheduled SUL transmission or the earlier configured CG-UL transmission grant is associated with eMBB, the UE 215 may not apply the modification to the LBT prior the SUL or CG-UL transmission. However, if the earlier scheduled SUL transmission or the earlier configured CG-UL transmission grant is associated with URLCC, the UE 215 may apply the modification to the LBT prior the SUL or CG-UL transmission.

FIG. 12A will be discussed in relation to FIGS. 12B and 12C to illustrate mechanisms for a temporary or time-dependent LBT configuration modification. FIG. 12A is a timing diagram illustrating a channel access contention scheme 1200 according to some aspects of the present disclosure. The scheme 1200 may be employed by BSs such as the BSs 105 and 205 and UEs such as the UEs 115 and 215 in a network such as the network 100. In particular, a BS 205 may manage channel access contentions as shown in the scheme 1200. In FIG. 12A, the x-axis represent time in some arbitrary units. In the scheme 1200, the BS 205 may modify an LBT configuration temporarily by specifying a time period during which a LBT configuration modification is valid or applicable.

At time T0, the BS 205 transmits a configured grant 1250 to the UE 215, for example, via dynamic DCI signaling. The configured grant 1250 may be substantially similar to the configured grants 250, 650, 850, and/or 950 and may indicate a set of configured resources, for example, at time T3, T4, and T6. The configured grant 1250 further includes an LBT configuration 1280 for the UE 215 to perform a CAT4 LBT (e.g., the CAT4 LBT 1240*a*, 1240*b*, or 1240*c*) prior to using a configured resource for transmission (e.g., the UL transmission 1242*a*, 1242*b*, or 1242*c*). The LBT configuration 1280 may be substantially similar to the LBT configurations 680, 880, 980, 1080, and/or 1180. For instance, the LBT configuration 1280 may include one or more LBT parameters, such as a CW size, a CW maximum value, a CW minimum value, a ED threshold, a CCA deferral period, and/or an earliest CAT4 starting point as discussed above for the CAT4 LBT 1240*a*, 1240*b*, and/or 1240*c*.

Similar to the schemes 900, 1000, 1100, the BS 205 may dynamically modify the LBT configuration 1280 at a later time after transmitting the configured grant 1250 to modify a channel access contention priority for transmitting the earlier granted UL transmission(s). In the scheme 1200, the BS 205 may further indicate that the modification to the LBT configuration 1280 is temporary (e.g., during a certain time interval). In the illustrated example of FIG. 12A, at time T1, the BS 205 transmits an LBT configuration modification 1214 to modify the LBT configuration 1280 during a modification period 1202 between time T2 and T5. The LBT configuration modification 1214 may modify one or more of the LBT parameters indicating by the LBT configuration 1280. For instance, the LBT configuration modification 1214 may decrease the channel access contention priority of the configured CG-UL transmissions during the modification period 1202.

Upon receiving the LBT configuration modification 1214, the UE 215 may apply the LBT configuration modification 1214 when transmitting a UL transmission in the modification period 1202, but may not apply the LBT configuration modification 1214 when transmitting a UL transmission outside the modification period 1202. In the illustrated example of FIG. 12A, the UE 215 applies the LBT configuration modification 1214 when performing the CAT4 LBT 1240*a* prior to transmitting the UL transmission 1242*a* at time T3 since the CAT4 LBT 1240*a* and the UL transmission 1242*a* are within the modification period 1202. Similarly, the UE 215 applies the LBT configuration modification 1214 when performing the CAT4 LBT 1240*b* prior to transmitting the UL transmission 1242*b* at time T4 since the CAT4 LBT 1240*b* and the UL transmission 1242*b* are within the modification period 1202. However, the UE 215 does not apply the LBT configuration modification 1214 when performing the CAT4 LBT 1240*c* prior to transmitting the UL transmission 1242*c* at time T6 since the CAT4 LBT 1240*c* and the UL transmission 1242*c* are outside the modification period 1202.

In some aspects, the LBT configuration modification 1214 may be a ED threshold modification as shown in FIG. 12B. In some aspects, the LBT configuration modification 1214 may modify the channel occupancy detection mechanism from a ED to a signal detection as shown in FIG. 12C.

FIG. 12B illustrates an LBT configuration modification 1290 according to some aspects of the present disclosure. The LBT configuration modification 1290 may correspond to the LBT configuration modification 1214 in FIG. 12A. The LBT configuration modification 1290 includes a ED threshold modification field 1282 and a modification period field 1284. The ED threshold modification field 1282 may indicate a modified ED threshold and the modification period field 1284 may indicate the modification period 1202 during which the modified ED threshold is to be applied for performing a CAT4 LBT.

In some aspects, the ED threshold modification field 1282 may indicate a ED threshold value, for example, in units of dBm. The ED threshold value may be a reduced ED threshold. For instance, the LBT configuration 1280 may indicate a ED threshold of about −72 dBm and the ED threshold modification field 1282 may indicate a ED threshold of about −78 dBm. In some aspects, the ED threshold modification field 1282 may indicate a number of decrements to be applied to the ED threshold, where the decrement may be in any suitable step size. In some aspects, the ED threshold modification field 1282 may request the UE 215 to modify the ED threshold based on a most recent RSRP measured from the serving BS 205. For instance, the UE 215 may receive a reference signal from the serving BS 205 and determine a RSRP of the reference signal. The UE 215 may utilize a higher ED threshold when the RSRP is high and may use a lower ED threshold when the RSRP is low. The modification of the ED threshold based on a RSRP measurement can be useful when the UE 215 moves away from the BS 205, and thus the BS 205 may have an outdated RSRP report from the UE 215 and may not be able to specify a suitable ED threshold for the UE 215.

In some aspects, the modification period field 1284 may indicate a starting time (e.g., T2) and an ending time (e.g., T5) of the modification period 1202. In some other aspects, the modification period field 1284 may indicate a starting time (e.g., T2) and a duration of the modification period 1202.

In some aspects, the BS 205 may transmit the LBT configuration modification 1290 when the BS 205 desires to contend for the channel during the modification period 1202 (e.g., to transmit a scheduling grant for a high-priority traffic), and thus the BS 205 may decrease the channel access contention priority of the UE 215 to allow the BS 205 to have a higher chance of winning the channel contention.

FIG. 12C illustrates an LBT configuration modification 1292 according to some aspects of the present disclosure. The LBT configuration modification 1292 may correspond to the LBT configuration modification 1214 in FIG. 12A. The LBT configuration modification 1292 includes a message/sequence detection field 1286 and a modification period field 1284. The modification period field 1284 may be substantially similar to the modification period field 1284. For instance, the modification period field 1284 may indicate the modification period 1202. The message/sequence detection field 1286 may indicate that the UE 215 is to perform an LBT based on a message detection or a sequence detection irrespective of a channel energy measurement during the modification period field 1284. In other words, the UE 215 is to determine whether a channel is available based on a signal detection and disregard a ED threshold that may have been configured earlier. For instance, the UE 215 may determine that the channel is busy if the UE 215 detected a particular message or sequence in the channel. Conversely, the UE 215 may determine that the channel is available if the UE 215 fails to detect the particular message or sequence in the channel. In some aspects, the message/sequence detection field 1282 may indicate a set of one or more predetermined sequences (e.g., preambles and/or certain waveforms) for detecting a channel status during an LBT. The UE 215 may determine whether a signal sequence is detected from the channel by computing a correlation between the signal received from the channel and the signal sequence and applying a correlation threshold to the computed correlation. If the computed correlation value is above the correlation threshold, the UE 215 determines that the signal sequence is detected. Otherwise, if the computed correlation value is below the correlation threshold, the UE 215 determines that the signal sequence is not detected. For instance, if the UE 215 detected any one of sequences in the set, the UE 215 may determine that the LBT fails. In some aspects, the message/sequence detection field 1286 may indicate a set of one or more messages (e.g., reservation messages) for detecting a channel status during an LBT. For instance, if the UE 215 detected any one of messages in the set, the UE 215 may determine that the LBT fails.

While the scheme 1200 is described in the context of applying a time-dependent LBT configuration modification to CG-UL transmissions, in some instances, similar time-dependent LBT configuration modification mechanisms can be applied to SUL transmissions.

Figure 13:
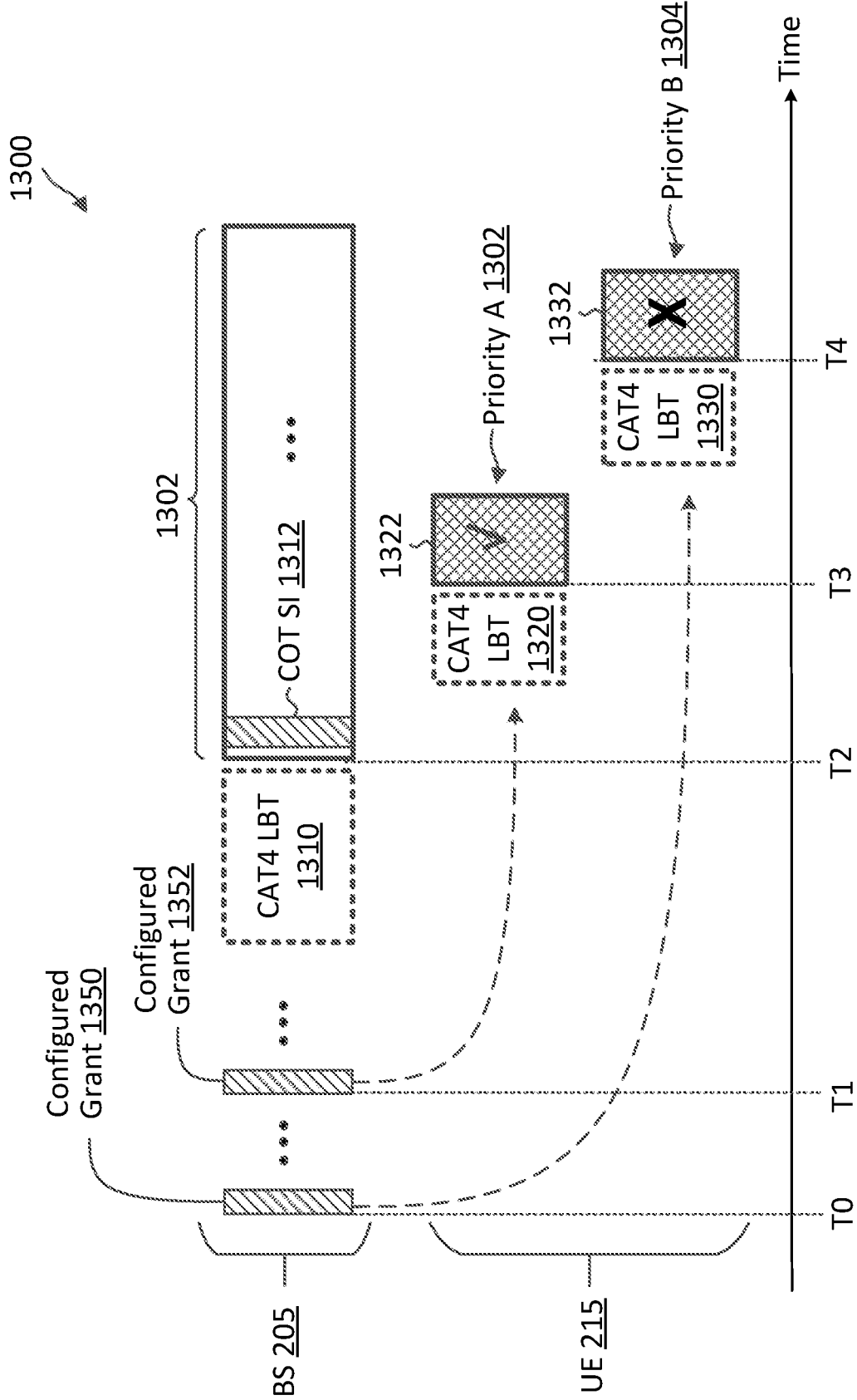
FIG. 13 is a timing diagram illustrating a channel access contention scheme according to some aspects of the present disclosure.

FIG. 13 is a timing diagram illustrating a channel access contention scheme 1300 according to some aspects of the present disclosure. The scheme 1300 may be employed by BSs such as the BSs 105 and 205 and UEs such as the UEs 115 and 215 in a network such as the network 100. In particular, a BS 205 may manage channel access contentions as shown in the scheme 1300. In FIG. 13, the x-axis represent time in some arbitrary units. In the scheme 1300, the BS 205 may indicate a traffic priority allowable for a CG-UL transmission during a COT of the BS 205 instead of allowing CG-UL transmission of any traffic priority in the BS 205's COT.

In the illustrated example of FIG. 13, at time T0, the BS 205 transmits a configured grant 1350 to configure the UE 215 with a first set of configured resources for CG-UL transmissions of a priority A 1302. For instance, the first set of configured resources include a configured resource at time T3. At time T1, the BS 205 transmits another configured grant 1352 to configure the UE 215 with a second set of configured resources for CG-UL transmissions of a priority B 1304 different from the priority A 1302. For instance, the second set of configured resources include a configured resource at time T4. Each of the configured grant 1350 and the configured grant 1352 may include a LBT configuration similar to the LBT configurations 680, 880, 980, 1080, 1180, and/or 1280.

The BS 205 performs a CAT4 LBT 1310 (e.g., the CAT4 LBT 210). The CAT4 LBT 1310 is a pass, and thus the BS 205 acquires a COT 1302 beginning at time T2. The BS 205 transmits a COT structure indicator (SI) 1312 indicating information associated with the COT 1302. The COT SI 1312 may indicate timing information associated with the COT 1302, for example, including a duration of the COT 1302 or an ending time of the COT 1302. Additionally, the BS 205 may determine what type of CG-UL transmissions is allowed during the COT 1302 and indicate an allowable CG-UL traffic priority class in the COT SI 1312. For instance, the COT SI 1312 indicates that CG-UL traffic of priority A 1302 is allowed in the COT 1302.

Upon receiving the COT SI 1312, the UE 215 is aware that the BS 205 had acquired the COT 1302 and allows CG-UL of priority A 1302 during the COT 1302. The UE 215 may desire to transmit a UL transmission 1322 using the configured resource at time T3 configured by the configured grant 1352. The UE 215 may determine that configured resource at time T3 is within the COT 1302. The UE 215 may determine that the CG-UL transmission 1322 is of priority A 1302, which is allowable in the COT 1302 based on the COT SI 1312. Accordingly, the UE 215 may proceed with performing a CAT4 LBT 1320 (e.g., CAT4 LBT 230, 240, and/or 1240) prior to time T3. If the CAT4 LBT 1240 is a pass, the UE 215 proceed with transmitting the CG-UL transmission 1322 at time T3 (shown by the checkmark).

Additionally, the UE 215 may desire to transmit a UL transmission 1332 using the configured resource at time T4 configured by the configured grant 1350. The UE 215 may determine that the configured resource at time T4 is within the COT 1302. The UE 215 may determine that the CG-UL transmission 1332 is of priority B 1304, which is not allowed in the COT 1302 based on the COT SI 1312. Accordingly, the UE 215 may refrain from transmitting the CG-UL transmission 1332 at time T4 as shown by the cross symbol "X", and thus may also refrain from performing the CAT4 LBT 1330 prior to time T4.

In some aspects, the priority A 1302 may correspond to a URLLC traffic class and the priority B 1304 may correspond to a eMBB traffic class. The BS 205 may allow a CG-UL transmission of URLLC during the COT 1302, but may not allow a CG-UL transmission of eMBB during the COT 1302.

In some aspects, the BS 205 may indicate a set of allowable traffic priority classes in the COT 1302. For instance, the COT SI 1312 may indicate a set of values identifying the set of allowable traffic priority classes in the COT 1302.

In some aspects, the BS 205 may enable or disable a CG-UL transmission in the COT 1302, for example, the BS 205 may have high-priority traffic (e.g., UL URLLC or DL URLLC) to be scheduled in the COT 1302. For instance, the BS 205 may include a flag in the COT SI 1312, where a bit-value of 1 may indicate that a CG-UL transmission is allowed in the COT 1302 and a bit-value of 0 may indicate that a CG-UL transmission is not allowed in the COT 1302.

As can be observed, the scheme 1300 provides the BS 205 with a greater control over transmissions in a COT of the BS 205, and thus may better serve traffic (e.g., DL URLLC or UL URLLC) that has a strict timing or latency requirement.

Figure 14:
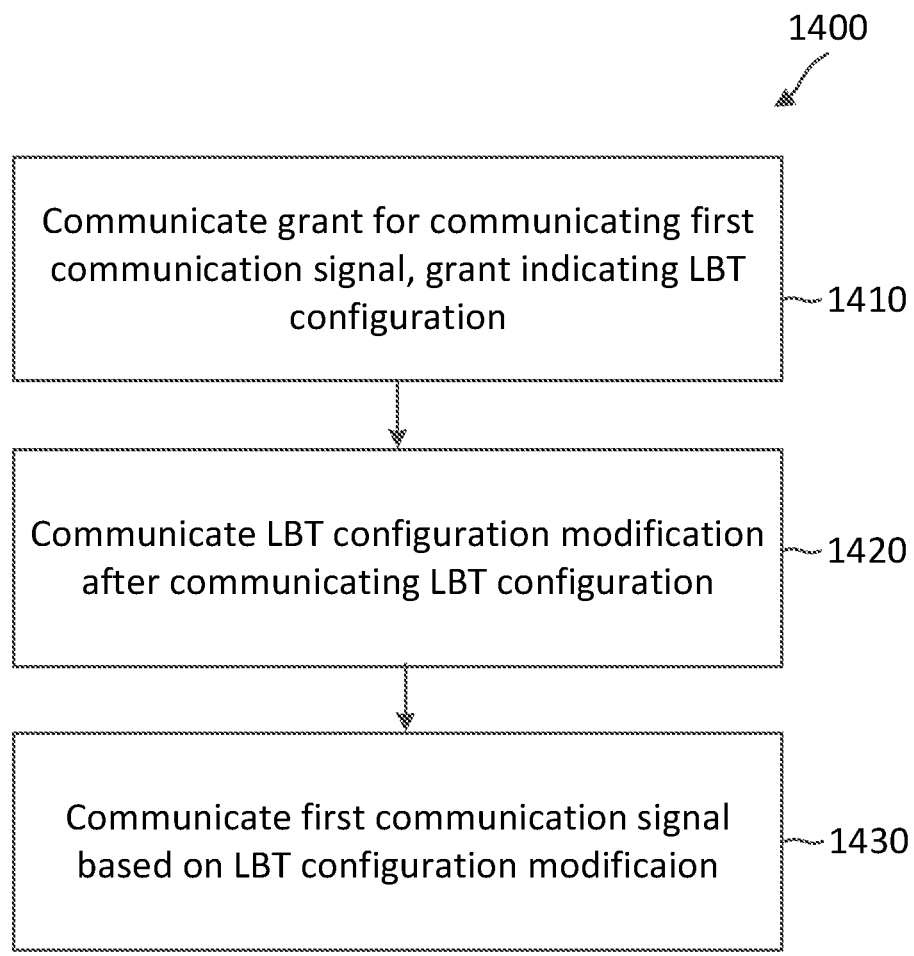
FIG. 14 is a flow diagram of a communication method according to some aspects of the present disclosure.

FIG. 14 is a flow diagram of a communication method 1400 according to some aspects of the present disclosure. Aspects of the method 1400 can be executed by a computing device (e.g., a processor, processing circuit, and/or other suitable component) of a wireless communication device or other suitable means for performing the steps. For example, a wireless communication device, such as the UEs 115, 215, and/or 400, may utilize one or more components, such as the processor 402, the memory 404, the channel access module 408, the transceiver 410, the modem 412, and the one or more antennas 416, to execute the steps of method 1400. Alternatively, a wireless communication device, such as the BSs 105, 205, and/or 500, may utilize one or more components, such as the processor 502, the memory 504, the channel access module 508, the transceiver 510, the modem 512, and the one or more antennas 516, to execute the steps of method 1400. The method 1400 may employ similar mechanisms as in the schemes 600, 700, 800, 900, 1000, 1100, 1200, and/or 1300 discussed above with respect to FIGS. 6A, 7, 8, 9, 10, 11, 12A, and/or 13, respectively. As illustrated, the method 1400 includes a number of enumerated steps, but aspects of the method 1400 may include additional steps before, after, and in between the enumerated steps. In some aspects, one or more of the enumerated steps may be omitted or performed in a different order.

At block 1410, a first wireless communication device, communicates with a second wireless communication device, a grant for communicating a first communication signal, the grant indicating an LBT configuration. In some instances, the first wireless communication device may utilize one or more components, such as the processor 402 and 502, the channel access module 408 and 508, the transceiver 410 and 510, the modem 412 and 512, and the one or more antennas 416 and 516, to communicate the grant.

In some aspects, the grant may be a configured UL grant similar to the configured grants 650, 850, 950, 1112, 1250, 1350, and/or 1352 and may be communicated via RRC signaling. In some aspects, the grant may be a dynamic UL scheduling grant similar to the scheduling grants 814, 1014, and/or 1112. The LBT configuration may be similar to the LBT configurations 680, 880, 980, 1080, 1180, and/or 1280.

At block 1420, the first wireless communication device communicates, with the second wireless communication device, an LBT configuration modification after communicating the grant. In some instances, the first wireless communication device may utilize one or more components, such as the processor 402 and 502, the channel access module 408 and 508, the transceiver 410 and 510, the modem 412 and 512, and the one or more antennas 416 and 516, to communicate the LBT configuration modification, for example, via dynamic DCI signaling, which may be UE-specific DCI or GC-DCI.

In some aspects, the LBT configuration indicates a first CW, and the LBT configuration modification indicates a second CW different from the first CW. In some aspects, the LBT configuration indicates a first CCA period, and the LBT configuration modification indicates a second CCA period different from the first CCA period. In some aspects, the LBT configuration indicates a first LBT starting time, and the LBT configuration modification indicates a second LBT starting time different from the first LBT starting time. In some aspects, the LBT configuration indicates a first ED threshold, and the LBT configuration modification indicates a second ED threshold different from the first ED threshold. In some aspects, the LBT configuration indicates a ED threshold, and the LBT configuration modification includes a configuration for modifying the ED threshold based on a RSRP measurement. In some aspects, the LBT configuration modification is associated with a time period (e.g., the modification period 1202) as discussed in the scheme 1200 with reference to FIG. 12A. In some aspects, the LBT configuration and the LBT configuration modification may be communicated over different frequency carriers and/or via different TRPs.

At block 1430, the first wireless communication device communicates, with the second wireless communication device, the first communication signal based on the LBT configuration modification. In some instances, the first wireless communication device may utilize one or more components, such as the processor 402 and 502, the channel access module 408 and 508, the transceiver 410 and 510, the modem 412 and 512, and the one or more antennas 416 and 516, to communicate the first communication signal based on the LBT configuration modification.

In some aspects, the first wireless communication device may correspond to a BS (e.g., the BSs 105, 205, and/or 500) and the second wireless communication device may correspond to a UE (e.g., the UEs 115, 215, and/or 400). Accordingly, the first wireless communication device may transmit the LBT configuration to the second wireless communication device at block 1410, transmit the LBT configuration modification to the second wireless communication device at block 1420, and receive the first communication signal from the second wireless communication device at block 1430.

In some aspects, the first wireless communication device may correspond to a UE (e.g., the UEs 115, 215, and/or 400) and the second wireless communication device may correspond to a BS (e.g., the BSs 105, 205, and/or 500). Accordingly, the first wireless communication device may receive the LBT configuration from the second wireless communication device at block 1410, receive the LBT configuration modification from the second wireless communication device at block 1420, and transmit the first communication signal based on the LBT configuration modification to the second wireless communication device at block 1430.

Figure 15:
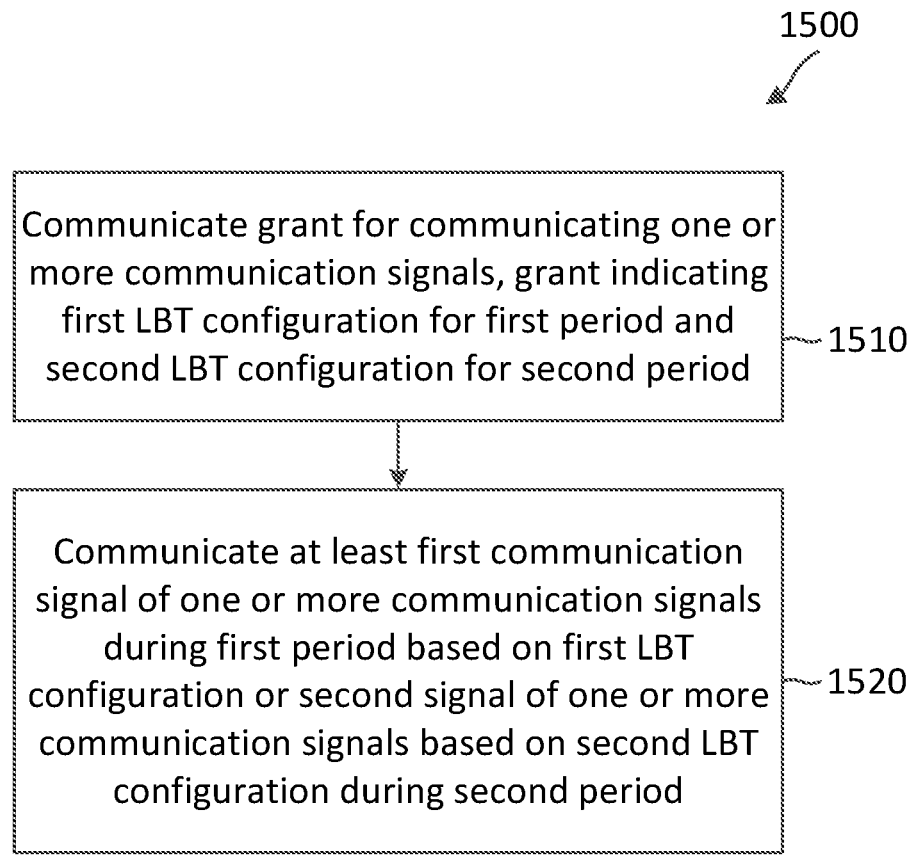
FIG. 15 is a flow diagram of a communication method according to some aspects of the present disclosure.

FIG. 15 is a flow diagram of a communication method 1500 according to some aspects of the present disclosure. Aspects of the method 1500 can be executed by a computing device (e.g., a processor, processing circuit, and/or other suitable component) of a wireless communication device or other suitable means for performing the steps. For example, a wireless communication device, such as the UEs 115, 215, and/or 400, may utilize one or more components, such as the processor 402, the memory 404, the channel access module 408, the transceiver 410, the modem 412, and the one or more antennas 416, to execute the steps of method 1500. Alternatively, a wireless communication device, such as the BSs 105, 205, and/or 500, may utilize one or more components, such as the processor 502, the memory 504, the channel access module 508, the transceiver 510, the modem 512, and the one or more antennas 516, to execute the steps of method 1500. The method 1500 may employ similar mechanisms as in the schemes 600 and 700 discussed above with respect to FIGS. 6A and 7, respectively. As illustrated, the method 1500 includes a number of enumerated steps, but aspects of the method 1500 may include additional steps before, after, and in between the enumerated steps. In some aspects, one or more of the enumerated steps may be omitted or performed in a different order.

At block 1510, a first wireless communication device communicates, with a second wireless communication device, a grant (e.g., the grant 650) for communicating one or more communication signals, the grant indicating a first LBT configuration associated with a first period and a second LBT configuration associated with a second period different from the first period. In some instances, the first wireless communication device may utilize one or more components, such as the processor 402 and 502, the channel access module 408 and 508, the transceiver 410 and 510, the modem 412 and 512, and the one or more antennas 416 and 516, to communicate the grant.

In some aspects, the first period (e.g., the restriction period 602) is after a COT during which a scheduled communication between the first wireless communication device and the second wireless communication device is granted, and the second period is outside the first period. In some aspects, the first LBT configuration prohibits a category 4 LBT and prohibits a transmission of the first communication signal in the first period after the COT. In some aspects, the first LBT configuration prohibits a category 4 LBT and prohibits a transmission of the first communication signal in the first period after the COT when the first communication signal has a same traffic priority as the scheduled communication. In some aspects, the first LBT configuration includes a first LBT parameter, and wherein the second LBT configuration includes a second LBT parameter different from the first LBT parameter, wherein the first LBT parameter and the second LBT parameter are associated with at least one of a ED threshold or a CW.

At block 1520, the first wireless communication device communicates, with the second wireless communication device, at least one of a first communication signal of the one or more communication signals based on the first LBT configuration during the first period or a second communication signal of the one or more communication signals based on the second LBT configuration during the second period. In some instances, the first wireless communication device may utilize one or more components, such as the processor 402 and 502, the channel access module 408 and 508, the transceiver 410 and 510, the modem 412 and 512, and the one or more antennas 416 and 516, to communicate the at least one of the first communication signal based on the first LBT configuration during the first period or the second communication signal based on the second LBT configuration during the second period.

In some aspects, the first wireless communication device may correspond to a BS (e.g., the BSs 105, 205, and/or 500) and the second wireless communication device may correspond to a UE (e.g., the UEs 115, 215, and/or 400). Accordingly, the first wireless communication device may transmit the grant to the second wireless communication device at block 1510 and receive the at least one of the first communication signal based on the first LBT configuration during the first period or the second communication signal based on the second LBT configuration during the second period at block 1520.

In some aspects, the first wireless communication device may correspond to a UE (e.g., the UEs 115, 215, and/or 400) and the second wireless communication device may correspond to a BS (e.g., the BSs 105, 205, and/or 500). Accordingly, the first wireless communication device may receive the grant from the second wireless communication device at block 1510 and transmit the at least one of the first communication signal based on the first LBT configuration during the first period or the second communication signal based on the second LBT configuration during the second period at block 1520.

In some aspects, the first wireless communication device may also communicate, with the second wireless communication device, an instruction to enable the first LBT configuration in the first period as discussed above in the scheme 700 with reference to FIG. 7. In some instances, the first wireless communication device may utilize one or more components, such as the processor 402 and 502, the channel access module 408 and 508, the transceiver 410 and 510, the modem 412 and 512, and the one or more antennas 416 and 516, to communicate the instruction to enable the first LBT configuration in the first period. In some aspects, the first wireless communication device may also communicate, with the second wireless communication device, an instruction to disable the first LBT configuration in the first period as discussed above in the scheme 700 with reference to FIG. 7. In some instances, the first wireless communication device may utilize one or more components, such as the processor 402 and 502, the channel access module 408 and 508, the transceiver 410 and 510, the modem 412 and 512, and the one or more antennas 416 and 516, to communicate the instruction to disable the first LBT configuration in the first period. Further aspects of the present disclosure include a method of wireless communication. The method of wireless communication includes communicating, by a first wireless communication device with a second wireless communication device, a grant for communicating a first communication signal, the grant indicating a listen-before-talk (LBT) configuration. The method of wireless communication also includes communicating, by the first wireless communication device with the second wireless communication device, a LBT configuration modification after communicating the grant. The method of wireless communication also includes communicating, by the first wireless communication device with the second wireless communication device, the first communication signal based on the LBT configuration modification.

The method of wireless communication may also include one or more of the following features. For instance, the method includes where the LBT configuration modification is associated with a channel access priority. The LBT configuration indicates a first contention window, and where the LBT configuration modification indicates a second contention window different from the first contention window. The LBT configuration indicates a first clear channel assessment period, and where the LBT configuration modification indicates a second clear channel assessment period different from the first clear channel assessment period. The LBT configuration indicates a first LBT starting time, and where the LBT configuration modification indicates a second LBT starting time different from the first LBT starting time. The LBT configuration indicates a first energy detection (ED) threshold, and where the LBT configuration modification indicates a second ED threshold different from the first ED threshold. The LBT configuration indicates an energy detection (ED) threshold, and where the LBT configuration modification includes a configuration for modifying the ED threshold based on a reference signal received power (RSRP) measurement. The LBT configuration modification is associated with a time period. The method may include performing, by the first wireless communication device, an LBT based on the LBT configuration modification in response to a determination that the first communication signal is to be communicated during the time period. The communicating the grant includes communicating, by the first wireless communication device with the second wireless communication device, a configured grant for the first communication signal via radio resource control (RRC) signaling. The communicating the grant includes communicating, by the first wireless communication device with the second wireless communication device, a scheduling grant for the first communication signal via downlink control information (DCI) signaling. The communicating the LBT configuration modification includes communicating, by the first wireless communication device with the second wireless communication device, the LBT configuration modification via downlink control information (DCI) signaling. The communicating the LBT configuration modification includes transmitting, by the first wireless communication device to a group of wireless communication devices including the second wireless communication device, the LBT configuration modification via group common-downlink control information (GC-DCI) signaling. The communicating the LBT configuration modification includes receiving, by the first wireless communication device from the second wireless communication device, the LBT configuration modification via group common-downlink control information (GC-DCI) signaling. The communicating the first communication signal includes transmitting, by the first wireless communication device to the second wireless communication device, the first communication signal using the LBT configuration modification in response to determining that the first communication signal is associated with the first traffic priority. The first traffic priority is associated with enhanced mobile broadband (eMBB), and where the second traffic priority is associated with ultra-reliable low-latency communication (URLLC). The communicating the LBT configuration modification includes transmitting, by the first wireless communication device to the second wireless communication device, the LBT configuration modification in response to the determining. The first communication signal is associated with enhanced mobile broadband (eMBB), and where the second communication signal is associated with ultra-reliable low-latency communication (URLLC). The communicating the grant includes communicating, by the first wireless communication device with the second wireless communication device, the grant over a first frequency carrier; and the communicating the LBT configuration modification includes communicating, by the first wireless communication device with the second wireless communication device, the LBT configuration modification over a second frequency carrier different from the first frequency carrier. The communicating the LBT configuration includes communicating, by the first wireless communication device with the second wireless communication device, the grant via a first transmission-reception point (TRP); and the communicating the LBT configuration modification includes communicating, by the first wireless communication device with the second wireless communication device, the LBT configuration modification via a second TRP different from the first TRP. The LBT configuration modification includes at least one of a signal detection configuration or a message detection configuration for determining a channel occupancy status. The communicating the first communication signal includes communicating, by the first wireless communication device with the second wireless communication device, the first communication signal during the configured period within the COT in response to a determination that the first communication signal is associated with the traffic priority allowed in the COT. The traffic priority allowed in the COT is associated with ultra-reliable low-latency communication (URLLC).

Further aspects of the present disclosure include a method of wireless communication. The method of wireless communication includes communicating, by a first wireless communication device with a second wireless communication device, a grant for communicating one or more communication signals, the grant indicating a first listen-before-talk (LBT) configuration associated with a first period, and a second LBT configuration associated with a second period different from the first period. The method of wireless communication also includes communicating, by the first wireless communication device with the second wireless communication device, at least one of a first communication signal of the one or more communication signals based on the first LBT configuration during the first period, or a second communication signal of the one or more communication signals based on the second LBT configuration during the second period.

The method of wireless communication may also include one or more of the following features. For instance, the method includes where the first period is after a channel occupancy time (COT) during which a scheduled communication between the first wireless communication device and the second wireless communication device is granted, and where the second period is outside the first period. First LBT configuration prohibits a category 4 LBT and prohibits a transmission of the first communication signal in the first period after the COT. First LBT configuration prohibits a category 4 LBT and prohibits a transmission of the first communication signal in the first period after the COT when the first communication signal has a same traffic priority as the scheduled communication. The first LBT configuration includes a first LBT parameter, and where the second LBT configuration includes a second LBT parameter different from the first LBT parameter, where the first LBT parameter and the second LBT parameter are associated with at least one of an energy detection (ED) threshold or a contention window (CW). The method may include communicating, by the first wireless communication device with the second wireless communication device, an instruction to enable the first LBT configuration in the first period. The method may include communicating, by the first wireless communication device with the second wireless communication device, an instruction to disable the first LBT configuration in the first period.

Further aspects of the present disclosure include an apparatus including a transceiver configured to communicate, with a second wireless communication device, a grant for communicating a first communication signal, the grant indicating a listen-before-talk (LBT) configuration; and communicate, with the second wireless communication device, a LBT configuration modification after communicating the grant; and communicate, with the second wireless communication device, the first communication signal based on the LBT configuration modification.

The apparatus may also include one or more of the following features. For instance, the apparatus includes where the LBT configuration modification is associated with a channel access priority. The LBT configuration indicates a first contention window, and where the LBT configuration modification indicates a second contention window different from the first contention window. The LBT configuration indicates a first clear channel assessment period, and where the LBT configuration modification indicates a second clear channel assessment period different from the first clear channel assessment period. The LBT configuration indicates a first LBT starting time, and where the LBT configuration modification indicates a second LBT starting time different from the first LBT starting time. The LBT configuration indicates a first energy detection (ED) threshold, and where the LBT configuration modification indicates a second ED threshold different from the first ED threshold. The LBT configuration indicates an energy detection (ED) threshold, and where the LBT configuration modification includes a configuration for modifying the ED threshold based on a reference signal received power (RSRP) measurement. The LBT configuration modification is associated with a time period. The apparatus may include a processor configured to perform an LBT based on the LBT configuration modification in response to a determination that the first communication signal is to be communicated during the time period. The transceiver configured to communicate the grant is configured to communicate, with the second wireless communication device, a configured grant for the first communication signal via radio resource control (RRC) signaling. The transceiver configured to communicate the grant is configured to communicate, device with the second wireless communication device, a scheduling grant for the first communication signal via downlink control information (DCI) signaling. The transceiver configured to communicate the LBT configuration modification is configured to communicate, with the second wireless communication device, the LBT configuration modification via downlink control information (DCI) signaling. The transceiver configured to communicate the LBT configuration modification is configured to transmit, to a group of wireless communication devices including the second wireless communication device, the LBT configuration modification via group common-downlink control information (GC-DCI) signaling. The transceiver configured to communicate the LBT configuration modification is configured to receive, from the second wireless communication device, the LBT configuration modification via group common-downlink control information (GC-DCI) signaling. The transceiver configured to communicate the first communication signal is configured to transmit, to the second wireless communication device, the first communication signal using the LBT configuration modification in response to determining that the first communication signal is associated with the first traffic priority. The first traffic priority is associated with enhanced mobile broadband (eMBB), and where the second traffic priority is associated with ultra-reliable low-latency communication (URLLC). The transceiver configured to communicate the LBT configuration modification is configured to transmit, to the second wireless communication device, the LBT configuration modification in response to the determination. The first communication signal is associated with enhanced mobile broadband (eMBB), and where the second communication signal is associated with ultra-reliable low-latency communication (URLLC). The transceiver configured to communicate the grant is configured to communicate, with the second wireless communication device, the grant over a first frequency carrier; and the transceiver configured to communicate the LBT configuration modification is configured to communicate, with the second wireless communication device, the LBT configuration modification over a second frequency carrier different from the first frequency carrier. The transceiver configured to communicate the LBT configuration is configured to communicate, with the second wireless communication device, the grant via a first transmission-reception point (TRP); and the transceiver configured to communicate the LBT configuration modification is configured to communicate, with the second wireless communication device, the LBT configuration modification via a second TRP different from the first TRP. The LBT configuration modification includes at least one of a signal detection configuration or a message detection configuration for determining a channel occupancy status. The transceiver is further configured to communicate, with the second wireless communication device, a channel occupancy time (COT) indicator indicating a COT and a traffic priority allowed in the COT; the apparatus further includes a processor configured to determine that a configured period for the first communication signal indicated by the grant is within the COT; and determine whether the first communication signal is associated with the traffic priority allowed in the COT; and the transceiver configured to communicate the first communication signal is configured to communicate, with the second wireless communication device, the first communication signal during the configured period within the COT in response to a determination that the first communication signal is associated with the traffic priority allowed in the COT. The traffic priority allowed in the COT is associated with ultra-reliable low-latency communication (URLLC).

Further aspects of the present disclosure include an apparatus including a transceiver configured to communicate, with a second wireless communication device, a grant for communicating one or more communication signals, the grant indicating a first listen-before-talk (LBT) configuration associated with a first period; and a second LBT configuration associated with a second period different from the first period. The apparatus also includes communicate, with the second wireless communication device, at least one of a first communication signal of the one or more communication signals based on the first LBT configuration during the first period, or a second communication signal of the one or more communication signals based on the second LBT configuration during the second period.

The apparatus may also include one or more of the following features. For instance, the apparatus includes where the first period is after a channel occupancy time (COT) during which a scheduled communication between the apparatus and the second wireless communication device is granted, and where the second period is outside the first period. First LBT configuration prohibits a category 4 LBT and prohibits a transmission of the first communication signal in the first period after the COT. First LBT configuration prohibits a category 4 LBT and prohibits a transmission of the first communication signal in the first period after the COT when the first communication signal has a same traffic priority as the scheduled communication. The first LBT configuration includes a first LBT parameter, and where the second LBT configuration includes a second LBT parameter different from the first LBT parameter, where the first LBT parameter and the second LBT parameter are associated with at least one of an energy detection (ED) threshold or a contention window (CW). The transceiver is further configured to communicate, with the second wireless communication device, an instruction to enable the first LBT configuration in the first period. The transceiver is further configured to communicate, with the second wireless communication device, an instruction to disable the first LBT configuration in the first period.

Further aspects of the present disclosure include a non-transitory computer-readable medium having program code recorded thereon. The non-transitory computer-readable medium includes code for causing a first wireless communication device to communicate, with a second wireless communication device, a grant for communicating a first communication signal, the grant indicating a listen-before-talk (LBT) configuration. The non-transitory computer-readable medium also includes code for causing the first wireless communication device to communicate, with the second wireless communication device, a LBT configuration modification after communicating the grant. The non-transitory computer-readable medium also includes code for causing the first wireless communication device to communicate, with the second wireless communication device, the first communication signal based on the LBT configuration modification.

The non-transitory computer-readable medium may also include one or more of the following features. For instance, the LBT configuration modification is associated with a channel access priority. The LBT configuration indicates a first contention window, and where the LBT configuration modification indicates a second contention window different from the first contention window. The LBT configuration indicates a first clear channel assessment period, and where the LBT configuration modification indicates a second clear channel assessment period different from the first clear channel assessment period. The LBT configuration indicates a first LBT starting time, and where the LBT configuration modification indicates a second LBT starting time different from the first LBT starting time. The LBT configuration indicates a first energy detection (ED) threshold, and where the LBT configuration modification indicates a second ED threshold different from the first ED threshold. The LBT configuration indicates an energy detection (ED) threshold, and where the LBT configuration modification includes a configuration for modifying the ED threshold based on a reference signal received power (RSRP) measurement. The LBT configuration modification is associated with a time period. The non-transitory computer-readable medium may include code for causing the first wireless communication device to perform an LBT based on the LBT configuration modification in response to a determination that the first communication signal is to be communicated during the time period. The code for causing the first wireless communication device to communicate the grant is configured to communicate, with the second wireless communication device, a configured grant for the first communication signal via radio resource control (RRC) signaling. The code for causing the first wireless communication device to communicate the grant is configured to communicate, device with the second wireless communication device, a scheduling grant for the first communication signal via downlink control information (DCI) signaling. The code for causing the first wireless communication device to communicate the LBT configuration modification is configured to communicate, with the second wireless communication device, the LBT configuration modification via downlink control information (DCI) signaling. The code for causing the first wireless communication device to communicate the LBT configuration modification is configured to transmit, to a group of wireless communication devices including the second wireless communication device, the LBT configuration modification via group common-downlink control information (GC-DCI) signaling. The code for causing the first wireless communication device to communicate the LBT configuration modification is configured to receive, from the second wireless communication device, the LBT configuration modification via group common-downlink control information (GC-DCI) signaling. The code for causing the first wireless communication device to communicate the first communication signal is configured to transmit, to the second wireless communication device, the first communication signal using the LBT configuration modification in response to determining that the first communication signal is associated with the first traffic priority. The first traffic priority is associated with enhanced mobile broadband (eMBB), and where the second traffic priority is associated with ultra-reliable low-latency communication (URLLC). The code for causing the first wireless communication device to communicate the LBT configuration modification is configured to transmit, to the second wireless communication device, the LBT configuration modification in response to the determination. The first communication signal is associated with enhanced mobile broadband (eMBB), and where the second communication signal is associated with ultra-reliable low-latency communication (URLLC). The code for causing the first wireless communication device to communicate the grant is configured to communicate, with the second wireless communication device, the grant over a first frequency carrier; and the code for causing the first wireless communication device to communicate the LBT configuration modification is configured to communicate, with the second wireless communication device, the LBT configuration modification over a second frequency carrier different from the first frequency carrier. The code for causing the first wireless communication device to communicate the LBT configuration is configured to communicate, with the second wireless communication device, the grant via a first transmission-reception point (TRP); and the code for causing the first wireless communication device to communicate the LBT configuration modification is configured to communicate, with the second wireless communication device, the LBT configuration modification via a second TRP different from the first TRP. The LBT configuration modification includes at least one of a signal detection configuration or a message detection configuration for determining a channel occupancy status. The code for causing the first wireless communication device to communicate the first communication signal is configured to communicate, with the second wireless communication device, the first communication signal during the configured period within the COT in response to a determination that the first communication signal is associated with the traffic priority allowed in the COT. The traffic priority allowed in the COT is associated with ultra-reliable low-latency communication (URLLC).

Further aspects of the present disclosure include a non-transitory computer-readable medium having program code recorded thereon. The non-transitory computer-readable medium includes code for causing a first wireless communication device to communicate, with a second wireless communication device, a grant for communicating one or more communication signals, the grant indicating a first listen-before-talk (LBT) configuration associated with a first period, and a second LBT configuration associated with a second period different from the first period. The non-transitory computer-readable medium also includes code for causing the first wireless communication device to communicate, with the second wireless communication device, at least one of a first communication signal of the one or more communication signals based on the first LBT configuration during the first period, or a second communication signal of the one or more communication signals based on the second LBT configuration during the second period.

The non-transitory computer-readable medium may also include one or more of the following features. For instance, the first period is after a channel occupancy time (COT) during which a scheduled communication between the first wireless communication device and the second wireless communication device is granted, and where the second period is outside the first period. First LBT configuration prohibits a category 4 LBT and prohibits a transmission of the first communication signal in the first period after the COT. First LBT configuration prohibits a category 4 LBT and prohibits a transmission of the first communication signal in the first period after the COT when the first communication signal has a same traffic priority as the scheduled communication. The first LBT configuration includes a first LBT parameter, and where the second LBT configuration includes a second LBT parameter different from the first LBT parameter, where the first LBT parameter and the second LBT parameter are associated with at least one of an energy detection (ED) threshold or a contention window (CW). The non-transitory computer-readable medium may include code for causing the first wireless communication device to communicate, with the second wireless communication device, an instruction to enable the first LBT configuration in the first period. The non-transitory computer-readable medium may include code for causing the first wireless communication device to communicate, with the second wireless communication device, an instruction to disable the first LBT configuration in the first period.

Further aspects of the present disclosure include an apparatus also including means for communicating, with a second wireless communication device, a grant for communicating a first communication signal, the grant indicating a listen-before-talk (LBT) configuration. The apparatus also includes means for communicating, with the second wireless communication device, a LBT configuration modification after communicating the grant. The apparatus also includes means for communicating, with the second wireless communication device, the first communication signal based on the LBT configuration modification.

The apparatus may also include one or more of the following features. For instance, the LBT configuration modification is associated with a channel access priority. The LBT configuration indicates a first contention window, and where the LBT configuration modification indicates a second contention window different from the first contention window. The LBT configuration indicates a first clear channel assessment period, and where the LBT configuration modification indicates a second clear channel assessment period different from the first clear channel assessment period. The LBT configuration indicates a first LBT starting time, and where the LBT configuration modification indicates a second LBT starting time different from the first LBT starting time. The LBT configuration indicates a first energy detection (ED) threshold, and where the LBT configuration modification indicates a second ED threshold different from the first ED threshold. The LBT configuration indicates an energy detection (ED) threshold, and where the LBT configuration modification includes a configuration for modifying the ED threshold based on a reference signal received power (RSRP) measurement. The LBT configuration modification is associated with a time period. The apparatus may include means for performing an LBT based on the LBT configuration modification in response to a determination that the first communication signal is to be communicated during the time period. The means for communicating the grant is configured to communicate, with the second wireless communication device, a configured grant for the first communication signal via radio resource control (RRC) signaling. The means for communicating the grant is configured to communicate, device with the second wireless communication device, a scheduling grant for the first communication signal via downlink control information (DCI) signaling. The means for communicating the LBT configuration modification is configured to communicate, with the second wireless communication device, the LBT configuration modification via downlink control information (DCI) signaling. The means for communicating the LBT configuration modification is configured to transmit, to a group of wireless communication devices including the second wireless communication device, the LBT configuration modification via group common-downlink control information (GC-DCI) signaling. The means for communicating the LBT configuration modification is configured to receive, from the second wireless communication device, the LBT configuration modification via group common-downlink control information (GC-DCI) signaling. The means for communicating the first communication signal is configured to transmit, to the second wireless communication device, the first communication signal using the LBT configuration modification in response to determining that the first communication signal is associated with the first traffic priority. The first traffic priority is associated with enhanced mobile broadband (eMBB), and where the second traffic priority is associated with ultra-reliable low-latency communication (URLLC). The means for communicating the LBT configuration modification is configured to transmit, to the second wireless communication device, the LBT configuration modification in response to the determination. The first communication signal is associated with enhanced mobile broadband (eMBB), and where the second communication signal is associated with ultra-reliable low-latency communication (URLLC). The means for communicating the grant is configured to communicate, with the second wireless communication device, the grant over a first frequency carrier; and the means for communicating the LBT configuration modification is configured to communicate, with the second wireless communication device, the LBT configuration modification over a second frequency carrier different from the first frequency carrier. The means for communicating the LBT configuration is configured to communicate, with the second wireless communication device, the grant via a first transmission-reception point (TRP); and the means for communicating the LBT configuration modification is configured to communicate, with the second wireless communication device, the LBT configuration modification via a second TRP different from the first TRP. The LBT configuration modification includes at least one of a signal detection configuration or a message detection configuration for determining a channel occupancy status. The means for communicating the first communication signal is configured to communicate, with the second wireless communication device, the first communication signal during the configured period within the COT in response to a determination that the first communication signal is associated with the traffic priority allowed in the COT. The traffic priority allowed in the COT is associated with ultra-reliable low-latency communication (URLLC).

Further aspects of the present disclosure include an apparatus including means for communicating, with a second wireless communication device, a grant for communicating one or more communication signals, the grant indicating a first listen-before-talk (LBT) configuration associated with a first period, and a second LBT configuration associated with a second period different from the first period. The apparatus also includes means for communicating, with the second wireless communication device, at least one of a first communication signal of the one or more communication signals based on the first LBT configuration during the first period, or a second communication signal of the one or more communication signals based on the second LBT configuration during the second period.

The apparatus may also include one or more of the following features. For instance, the apparatus includes where the first period is after a channel occupancy time (COT) during which a scheduled communication between the first wireless communication device and the second wireless communication device is granted, and where the second period is outside the first period. First LBT configuration prohibits a category 4 LBT and prohibits a transmission of the first communication signal in the first period after the COT. First LBT configuration prohibits a category 4 LBT and prohibits a transmission of the first communication signal in the first period after the COT when the first communication signal has a same traffic priority as the scheduled communication. The first LBT configuration includes a first LBT parameter, and where the second LBT configuration includes a second LBT parameter different from the first LBT parameter, where the first LBT parameter and the second LBT parameter are associated with at least one of an energy detection (ED) threshold or a contention window (CW). The apparatus may include means for communicating, with the second wireless communication device, an instruction to enable the first LBT configuration in the first period. The apparatus may include means for communicating, with the second wireless communication device, an instruction to disable the first LBT configuration in the first period.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication, comprising:
   communicating, by a first wireless communication device with a second wireless communication device over a first frequency carrier, a grant for communicating a first communication signal, the grant indicating a listen-before-talk (LBT) configuration; and
   communicating, by the first wireless communication device with the second wireless communication device over a second frequency carrier different from the first frequency carrier based on a second communication signal having a higher traffic priority than the first communication signal, a LBT configuration modification after communicating the grant; and
   communicating, by the first wireless communication device with the second wireless communication device, the first communication signal based on the LBT configuration modification.

2. The method of claim 1, wherein the LBT configuration modification is associated with a channel access priority.

3. The method of claim 1, wherein the LBT configuration indicates a first contention window, and wherein the LBT configuration modification indicates a second contention window different from the first contention window.

4. The method of claim 1, wherein the LBT configuration indicates a first clear channel assessment period, and wherein the LBT configuration modification indicates a second clear channel assessment period different from the first clear channel assessment period.

5. The method of claim 1, wherein the LBT configuration indicates a first LBT starting time, and wherein the LBT configuration modification indicates a second LBT starting time different from the first LBT starting time.

6. The method of claim 1, wherein:
   the LBT configuration modification is associated with a time period; and
   the method further comprises:
   performing, by the first wireless communication device, an LBT based on the LBT configuration modification in response to a determination that the first communication signal is to be communicated during the time period.

7. The method of claim 1, wherein the communicating the LBT configuration modification includes:
   communicating, by the first wireless communication device with the second wireless communication device, the LBT configuration modification via downlink control information (DCI) signaling.

8. The method of claim 1, wherein the communicating the LBT configuration modification includes:
   communicating, by the first wireless communication device with the second wireless communication device, the LBT configuration modification via group common-downlink control information (GC-DCI) signaling.

9. The method of claim 1, further comprising:
   determining, by the first wireless communication device, whether the first communication signal is associated with a first traffic priority or a second traffic priority, wherein the communicating the first communication signal includes:

transmitting, by the first wireless communication device to the second wireless communication device, the first communication signal using the LBT configuration modification in response to determining that the first communication signal is associated with the first traffic priority.

10. The method of claim 1, further comprising:
determining, by the first wireless communication device, that the second communication signal has the higher traffic priority than the first communication signal,
wherein the communicating the LBT configuration modification includes:
transmitting, by the first wireless communication device to the second wireless communication device, the LBT configuration modification in response to the determining.

11. The method of claim 1, wherein:
the communicating the LBT configuration includes:
communicating, by the first wireless communication device with the second wireless communication device, the grant via a first transmission-reception point (TRP); and
the communicating the LBT configuration modification includes:
communicating, by the first wireless communication device with the second wireless communication device, the LBT configuration modification via a second TRP different from the first TRP.

12. The method of claim 1, wherein the LBT configuration modification includes at least one of a signal detection configuration or a message detection configuration for determining a channel occupancy status.

13. An apparatus comprising:
a transceiver configured to:
communicate, with a second wireless communication device over a first frequency carrier, a grant for communicating a first communication signal, the grant indicating a listen-before-talk (LBT) configuration; and
communicate, with the second wireless communication device over a second frequency carrier different from the first frequency carrier based on a second communication signal having a higher traffic priority than the first communication signal, a LBT configuration modification after communicating the grant; and
communicate, with the second wireless communication device, the first communication signal based on the LBT configuration modification.

14. The apparatus of claim 13, wherein the LBT configuration modification is associated with a channel access priority.

15. The apparatus of claim 13, wherein the LBT configuration modification indicates at least one of:
a first contention window different from a second contention window indicated in the LBT configuration;
a first clear channel assessment period different from a second clear channel assessment period indicated in the LBT configuration; or
a first LBT starting time different from a second LBT starting time indicated in the LBT configuration.

16. The apparatus of claim 13, wherein the transceiver configured to communicate the LBT configuration modification is configured to:
communicate, with the second wireless communication device, the LBT configuration modification via downlink control information (DCI) signaling.

17. The apparatus of claim 13, wherein the transceiver configured to communicate the LBT configuration modification is configured to:
communicate, with the second wireless communication device, the LBT configuration modification via group common-downlink control information (GC-DCI) signaling.

18. The apparatus of claim 13, wherein:
the transceiver configured to communicate the LBT configuration is configured to:
communicate, with the second wireless communication device, the grant via a first transmission-reception point (TRP); and
the transceiver configured to communicate the LBT configuration modification is configured to:
communicate, with the second wireless communication device, the LBT configuration modification via a second TRP different from the first TRP.

19. The apparatus of claim 13, wherein the LBT configuration modification includes at least one of a signal detection configuration or a message detection configuration for determining a channel occupancy status.

20. An apparatus comprising:
means for communicating, with a second wireless communication device over a first frequency carrier, a grant for communicating a first communication signal, the grant indicating a listen-before-talk (LBT) configuration; and
means for communicating, with the second wireless communication device over a second frequency carrier different from the first frequency carrier based on a second communication signal having a higher traffic priority than the first communication signal, a LBT configuration modification after communicating the grant; and
means for communicating, with the second wireless communication device, the first communication signal based on the LBT configuration modification.

21. The apparatus of claim 20, wherein the LBT configuration modification is associated with a channel access priority.

22. The apparatus of claim 20, wherein the LBT configuration modification indicates at least one of:
a first contention window different from a second contention window indicated in the LBT configuration;
a first clear channel assessment period different from a second clear channel assessment period indicated in the LBT configuration; or
a first LBT starting time different from a second LBT starting time indicated in the LBT configuration.

23. The apparatus of claim 20, wherein the means for communicating the LBT configuration modification comprises:
means for communicating, with the second wireless communication device, the LBT configuration modification via downlink control information (DCI) signaling.

24. The apparatus of claim 20, wherein the means for communicating the LBT configuration modification comprises:
means for communicating, with the second wireless communication device, the LBT configuration modification via group common-downlink control information (GC-DCI) signaling.

25. A non-transitory computer-readable medium having program code recorded thereon, the program code comprising:

code for causing an apparatus to communicate, with a second wireless communication device over a first frequency carrier, a grant for communicating a first communication signal, the grant indicating a listen-before-talk (LBT) configuration; and code for causing the apparatus to communicate over a second frequency carrier different from the first frequency carrier, with the second wireless communication device based on a second communication signal having a higher traffic priority than the first communication signal, a LBT configuration modification after communicating the grant; and code for causing the apparatus to communicate, with the second wireless communication device, the first communication signal based on the LBT configuration modification.

26. The non-transitory computer-readable medium of claim 25, wherein the LBT configuration modification is associated with a channel access priority.

27. The non-transitory computer-readable medium of claim 25, wherein the LBT configuration modification indicates at least one of:

a first contention window different from a second contention window indicated in the LBT configuration;

a first clear channel assessment period different from a second clear channel assessment period indicated in the LBT configuration; or a first LBT starting time different from a second LBT starting time indicated in the LBT configuration.

28. The non-transitory computer-readable medium of claim 25, the code further comprising:

code for causing the apparatus to communicate, with the second wireless communication device, the LBT configuration modification via downlink control information (DCI) signaling.

* * * * *